United States Patent [19]
Hieda

[11] Patent Number: 5,966,171
[45] Date of Patent: Oct. 12, 1999

[54] DIGITAL VIDEO CAMERA WITH ELECTRONIC ZOOM

[75] Inventor: Teruo Hieda, Yokohama, Japan

[73] Assignee: Canon Kabushiki Kaisha, Tokyo, Japan

[21] Appl. No.: 08/882,657

[22] Filed: Jun. 25, 1997

Related U.S. Application Data

[63] Continuation of application No. 08/213,927, Mar. 16, 1994, abandoned.

[30] Foreign Application Priority Data

| Mar. 19, 1993 | [JP] | Japan | 5-085574 |
| May 31, 1993 | [JP] | Japan | 5-152981 |
| Jun. 11, 1993 | [JP] | Japan | 5-166318 |

[51] Int. Cl.$^6$ .................................................. H04N 5/262
[52] U.S. Cl. ............................................ 348/240; 348/222
[58] Field of Search ........................... 348/222, 234, 348/240, 712, 713, 704, 582; 358/906, 909.1; H04N 5/262, 5/228

[56] References Cited

U.S. PATENT DOCUMENTS

| 4,858,032 | 8/1989 | Okada et al. . | |
| 5,095,364 | 3/1992 | Asaida | 348/234 |
| 5,299,022 | 3/1994 | Nagumo | 358/906 |
| 5,339,105 | 8/1994 | Iura | 348/240 |
| 5,552,826 | 9/1996 | Hieda | 348/222 |
| 5,570,128 | 10/1996 | Kawahara | 348/222 |
| 5,572,253 | 11/1996 | Ueda | 348/222 |
| 5,572,254 | 11/1996 | Kawahara | 348/222 |

FOREIGN PATENT DOCUMENTS

| 463827 | 1/1992 | European Pat. Off. . |
| 0463827 A2 | 2/1992 | European Pat. Off. . |
| 0501718 A1 | 2/1992 | European Pat. Off. . |
| 0501718 | 9/1992 | European Pat. Off. . |
| 0520759 | 12/1992 | European Pat. Off. . |
| 0521367 | 1/1993 | European Pat. Off. . |
| 0521367 A2 | 7/1993 | European Pat. Off. . |
| 0558338 | 9/1993 | European Pat. Off. . |
| 0592005 | 4/1994 | European Pat. Off. . |
| 60-194683 | 10/1985 | Japan . |
| 63-82066 | 4/1988 | Japan . |
| 2069795 | 8/1981 | United Kingdom . |
| 2243710 | 11/1991 | United Kingdom . |
| 9103909 | 3/1991 | WIPO . |

OTHER PUBLICATIONS

Patent Abstracts of Japan, vol. 10, No. 39 (E–381) published Feb. 15, 1986, corresponding to Japanese Patent No. JP–A–60 194 683.
Symposium Record of the Broadcast Sessions, pp. 250–269, XP268896, Jun. 13, 1992.
Abstract 98201698.2.
Abstract 98201701.4.
Japanese Patent Abstract JP2132988, Futugawa Yoshikiyo, *Digital Y/C Separating Method*, May 22, 1990.

*Primary Examiner*—Sherrie Hsia
*Attorney, Agent, or Firm*—Morgan & Finnegan, L.L.P.

[57] ABSTRACT

In order to achieve a digital video camera apparatus which decreases the number of components and facilitates connection with a digital VTR, a luminance signal Y and a color signal C input from external input terminals (110, 118) are converted into digital signals by A/D converters (136, 138) by sampling these signals respectively at the sampling frequency of a digital recording/reproduction device (113) and a frequency four times the subcarrier frequency, the digital signals are selected by selectors (135, 137) together with signals Y and C from a digital signal processing circuit (106), and the selected signals are supplied to the digital signal recording/reproduction device (113). Color-difference signals are supplied after their frequency is converted into the sampling frequency of the digital signal recording/reproduction device (113) by frequency converters (139*a*, 139*b*).

9 Claims, 20 Drawing Sheets

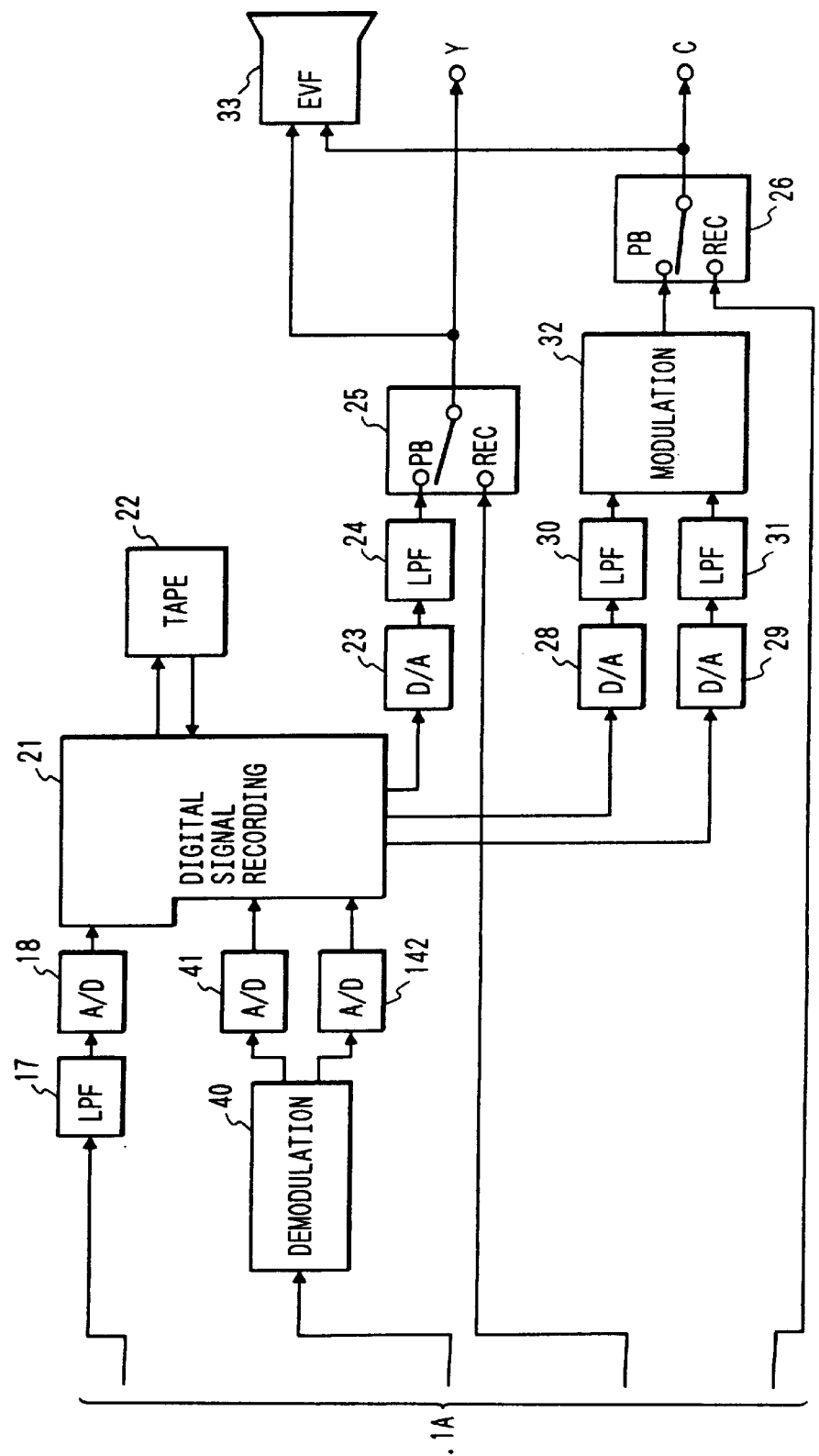

FIG. 2

| FIG. 2A |
|---------|
| FIG. 2B |

FIG. 2A

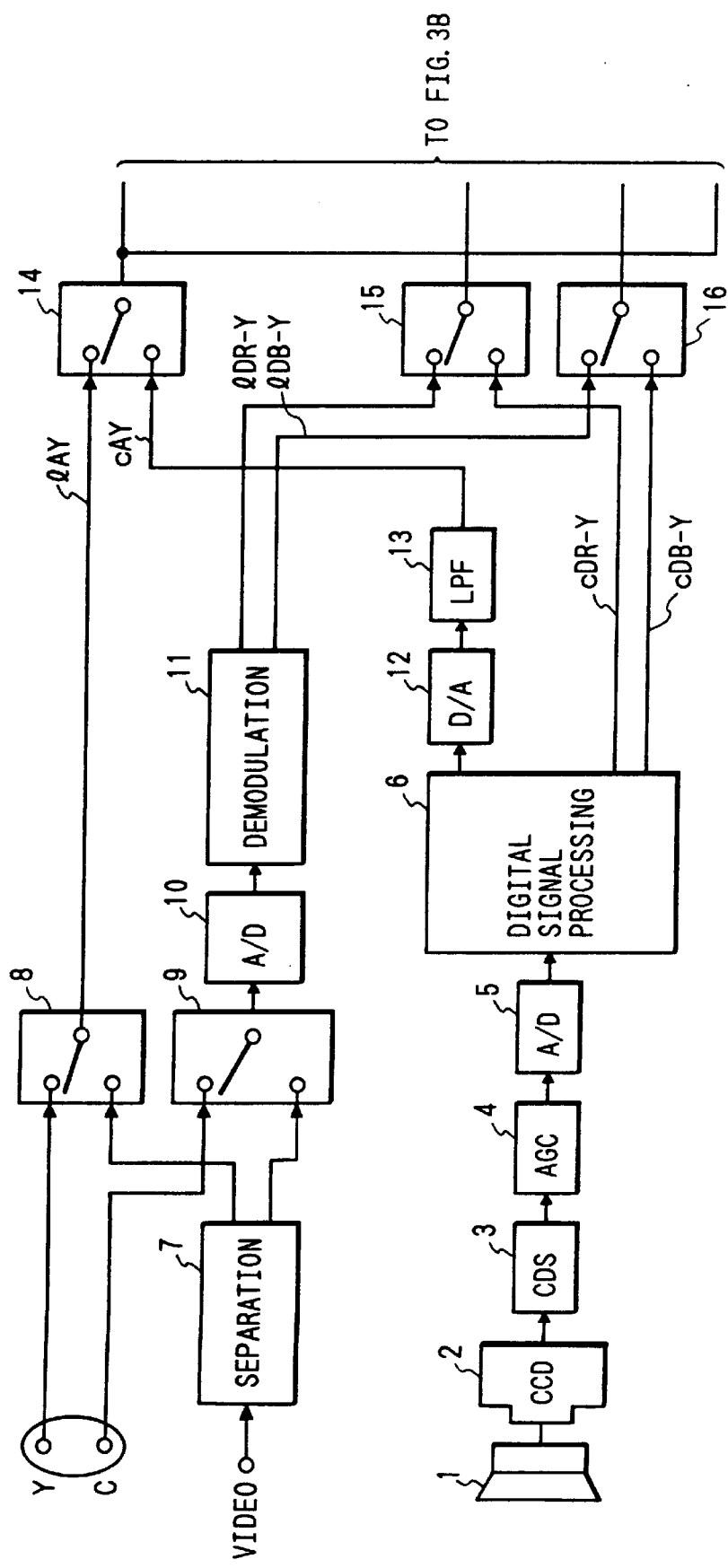

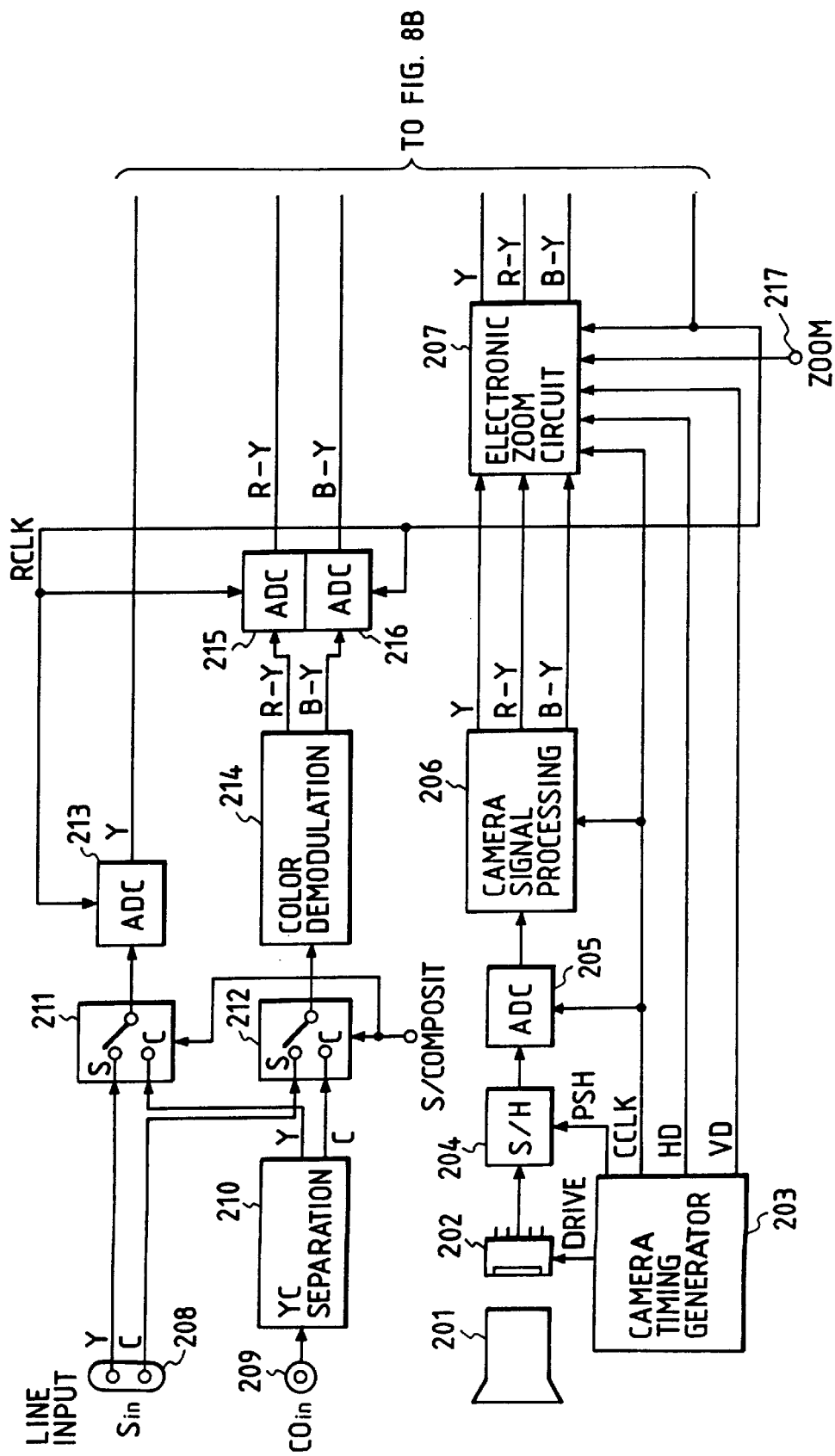

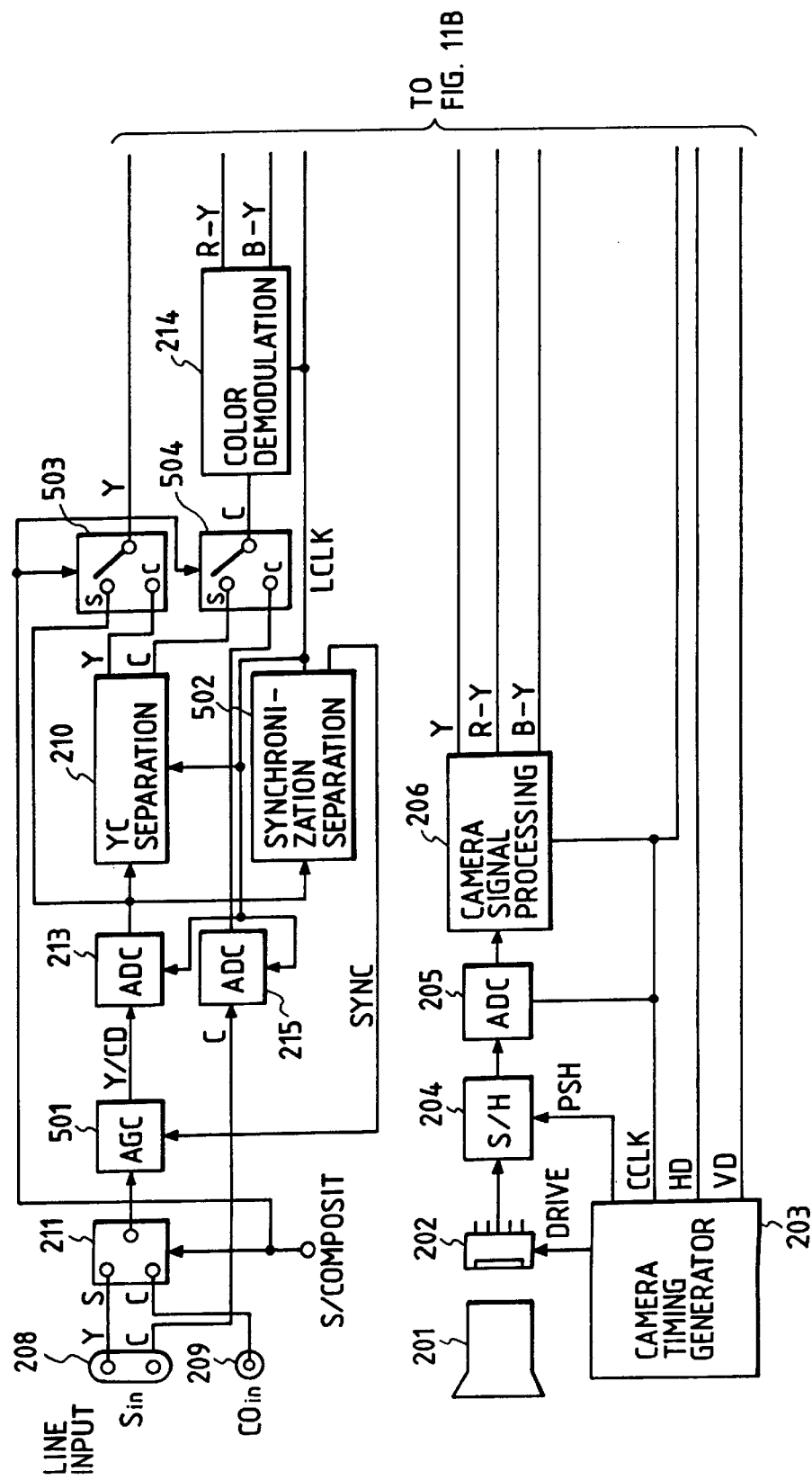

DIGITAL VIDEO CAMERA WITH ELECTRONIC ZOOM

This is a continuation of application Ser. No. 08/213,927, filed on Mar. 16, 1994 now abandoned.

BACKGROUND OF THE INVENTION

1. Field of the Invention

The present invention relates to a digital video camera and, more particularly, to an apparatus suitably used in a video camera apparatus for converting an analog video signal obtained by an image pickup element into a digital video signal and performing digital signal processing.

2. Related Background Art

FIGS. 1A and 1B show a conventional video camera apparatus for A/D-converting an analog signal output from a solid-state image pickup element, and performing signal processing in a digital form. Referring to FIGS. 1A and 1B, a video signal obtained via a lens element 1, a solid-state image pickup device 2, a correlation double sampling circuit 3, and a gain adjustment circuit 4 is sampled by an A/D converter 5 to be converted into a digital signal.

The sampled digital signal is supplied to a digital signal processing circuit 6. The digital signal processing circuit 6 generates a digital luminance signal and digital color-difference signals from the input digital signal. The digital luminance signal generated by the digital signal processing circuit 6 is converted into a band-limited analog luminance signal via a D/A converter 12 and a low-pass filter 13.

The digital color-difference signals are converted into band-limited analog color-difference signals via D/A converters 35 and 36 and low-pass filters 37 and 38. Furthermore, the analog color-difference signals are supplied to a modulation circuit 39 to be converted into an analog chrominance signal. The analog chrominance signal is supplied to a digital signal recording device 21 together with the analog luminance signal. The processing so far is executed at the sampling frequency of the image pickup element.

When YC-separated input signals are externally input as a video signal, these signals are respectively input to switch circuits 8 and 9. When a composite video signal VIDEO is input, the signal VIDEO is separated into luminance and chrominance signals by a luminance/chrominance separation circuit 7, and the separated signals are input to the switch circuits 8 and 9. One of these YC-separated input signals and the composite video signal is selected by the switch circuits 8 and 9.

The analog luminance and color-difference signals from a camera and externally input analog luminance and color-difference signals are selected by switch circuits 14 and 15. The frequency band of the analog luminance signal is limited by a low-pass filter 17. The band-limited analog luminance signal is supplied to an A/D converter 18 to be converted into a digital luminance signal.

The analog chrominance signal is converted into analog color-difference signals by a demodulation device 40, and the analog color-difference signals are then converted into digital color-difference signals by A/D converters 41 and 42. In this case, the A/D conversion is performed at the sampling frequency of a digital VTR.

The digital signal recording device records the digital luminance and color-difference signals, which are converted, as described above, on a magnetic tape 22. Thus, a digital video signal is recorded.

At this time, switch circuits 25 and 26 are switched to the REC side, and the analog luminance and chrominance signals are selected and output by the switch circuits 25 and 26. An EVF 33 performs a display operation based on the output luminance and chrominance signals for monitoring an image pickup operation.

In a reproduction mode, the digital signal recording device 21 generates digital reproduced luminance and color-difference signals from a signal reproduced from the magnetic tape 22. Of these signals, the reproduced luminance signal is converted into an analog luminance signal by a D/A converter 23 which operates at the sampling frequency of the digital VTR, and thereafter, the frequency band of the analog luminance signal is limited by a low-pass filter 24, thus obtaining an analog reproduced luminance signal.

On the other hand, the digital color-difference signals are converted into analog color-difference signals by D/A converters 28 and 29 which operate at the sampling frequency of the digital VTR. The frequency bands of these analog color-difference signals are then limited by low-pass filters 30 and 31 to obtain an analog reproduced color-difference signal. Furthermore, the analog reproduced color-difference signal is modulated by a modulation device 32.

At this time, the switch circuits 25 and 26 are switched to the PB side, selecting the modulated analog reproduced color-difference signals together with the analog reproduced luminance signal, and output these signals as a reproduced video signal.

In the case of the conventional digital video camera apparatus shown in FIGS. 1A and 1B, in order to allow recording/reproduction of both digital luminance and color-difference signals from the camera and external analog luminance and color-difference signals, many A/D converters, D/A converters, and the like are required. For this reason, the circuit scale constituting the digital video camera apparatus becomes large, and it is difficult to reduce cost.

In conventional image pickup recording apparatuses adopting a digital signal processing system, an image pickup signal processing circuit is an analog circuit, and an output signal from the analog processing circuit is converted into a digital signal. For this reason, due to a large circuit scale, the number of components becomes large, and current consumption undesirably increases. Also, it is difficult to make the apparatus compact, and to reduce cost.

Since the apparatus includes both an analog signal processing circuit and a digital signal processing circuit, a sufficient S/N ratio cannot often be obtained due to interference such as mixing of a digital signal into an analog signal, and the apparatus cannot be rendered compact.

Since the image pickup signal processing circuit adopts analog processing, image quality is determined by performance such as the frequency characteristics, noise characteristics, a change in performance due to a change in temperature, a variation in characteristics in units of circuits, and the like, and it is difficult to achieve high image quality.

In order to attain special effects using a frame memory and a digital calculation, a still larger number of circuit components are required. As a result, it is difficult to make the apparatus compact, and power consumption undesirably increases.

SUMMARY OF THE INVENTION

The present invention has been made in consideration of the above-mentioned problems, and has as its object to simplify the circuit arrangement of a digital video camera apparatus which selects one of a video signal from a digital video camera and a video signal from an external input terminal, and records the selected video signal on a recording medium.

The present invention has been made to solve the above-mentioned problems, and has as its another object to provide a digital video camera apparatus having a small number of components.

The present invention has been made in consideration of the above-mentioned problems, and has as its still another object to simplify the circuit arrangement of an apparatus for digitally recording an image pickup signal.

In a digital video camera apparatus according to an aspect of the present invention, which comprises a digital signal processing circuit and a digital signal recording device and in which an analog video signal supplied from an image pickup element is converted into a digital video signal, the converted digital video signal is supplied to the digital signal processing circuit, and the digital signal recording device records the digital video signal on a recording medium after predetermined signal processing, and of signals to be supplied from the digital signal processing circuit to the digital signal recording device, a luminance signal is supplied in a state of an analog signal and a chrominance signal is supplied in a state of a digital signal.

According to another aspect of the present invention, the chrominance signal is supplied in a state of a digital signal sampled at the frequency of clocks of the image pickup element.

According to still another aspect of the present invention, an externally input luminance signal is supplied in a state of an analog signal, and an externally input chrominance signal is supplied in a state of a digital signal which is sampled at a frequency four times that of a subcarrier.

Therefore, when a signal from a solid-state image pickup element is A/D-converted and processed in a digital region, and the processed signal is then connected to an existing digital recording device, a luminance signal supplied from the solid-state image pickup element and an externally input luminance signal are supplied in an analog state, color-difference signals are supplied to the digital recording device in a state of digital color-difference signals at the sampling frequency of the solid-state image pickup element, and an externally input chrominance signal is supplied after it is sampled at a frequency four times that of the subcarrier, and the sampled signal is converted into digital color-difference signals. Therefore, the arrangement of the circuit required for selecting one of a video signal input from the digital video camera and a video signal input from the external input terminal, and recording the selected signal on a recording medium can be simplified.

According to still another aspect of the present invention, when a signal from a solid-state image pickup element is A/D-converted and processed in a digital region, and the processed signal is then connected to an existing digital signal recording device, an externally input luminance signal to be supplied to the digital signal recording device is A/D-converted at the sampling frequency of the digital signal recording device, and an externally input chrominance signal to be supplied to the digital signal recording device is A/D-converted at, e.g., a frequency four times the subcarrier frequency.

According to still another aspect of the present invention, when a signal from a solid-state image pickup element is A/D-converted and processed in a digital region, and the processed signal is then connected to an existing digital signal recording/reproduction device, digital color-difference signals from a camera unit are supplied to a modulation circuit without changing their sampling frequency, e.g., four times the subcarrier frequency, and color-difference output signals from the digital signal recording/reproduction device are frequency-converted and are then modulated in the digital region.

According to still another aspect of the present invention, when a signal from a solid-state image pickup element is A/D-converted and processed in a digital region, and the processed signal is then connected to an existing digital signal recording/reproduction device, the sampling frequency of digital color-difference signals from a camera unit is converted, and color-difference signals to be output are modulated in an analog region.

In this manner, the number of components can be decreased, and an existing digital signal processing camera and an existing digital VTR can be easily connected.

An image pickup recording apparatus according to still another aspect of the present invention has an electronic zoom circuit for electronically enlarging or reducing an image. The apparatus has a first clock for operating an image pickup unit, and a second clock, having a frequency different from that of the first clock, for operating a recording unit. In the electronic zoom circuit, image pickup video signal data at the first clock rate is converted into video signal data at the second clock rate.

According to still another aspect of the present invention, a circuit for separating and forming a luminance signal and a chrominance signal from a digital signal obtained by A/D-converting a color image pickup element output signal is constituted by a plurality of stages of delay circuits, a plurality of coefficient multipliers for respectively multiplying the outputs from the plurality of stages of delay circuits with predetermined coefficients, an adding up circuit for adding up the outputs from the plurality of coefficient multipliers, and a chrominance signal forming circuit for forming a chrominance signal using some of signals output from the plurality of stages of delay circuits.

Therefore, since image pickup video signal data at the first clock rate for operating the image pickup unit and video signal data at the second clock rate for operating the recording unit are converted in the electronic zoom circuit, a video signal formed by a camera can be recorded by a digital recorder without being D/A converted, thus minimizing deterioration of image quality. In addition, since the number of digital circuit portions increases, high integration, low power consumption, and high precision can be realized.

The above and other objects and features of the present invention will become apparent from the following description of the specification and the drawings.

DETAILED DESCRIPTION OF THE PREFERRED EMBODIMENTS

Figure 1A:
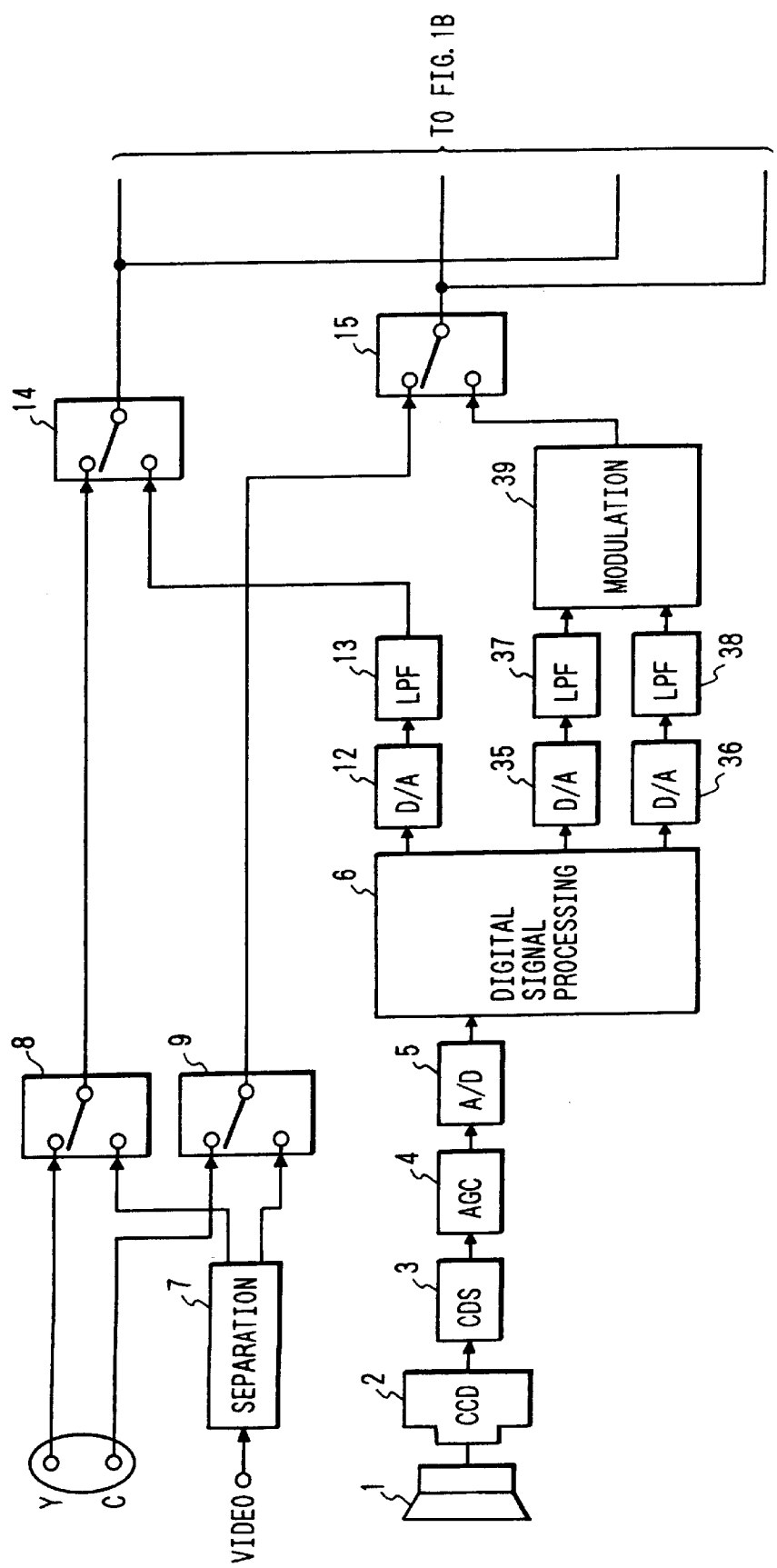
FIG. 1 which is comprised of FIGS. 1A and 1B is a block diagram showing the arrangement of a conventional digital video camera apparatus.
Figure 2B:
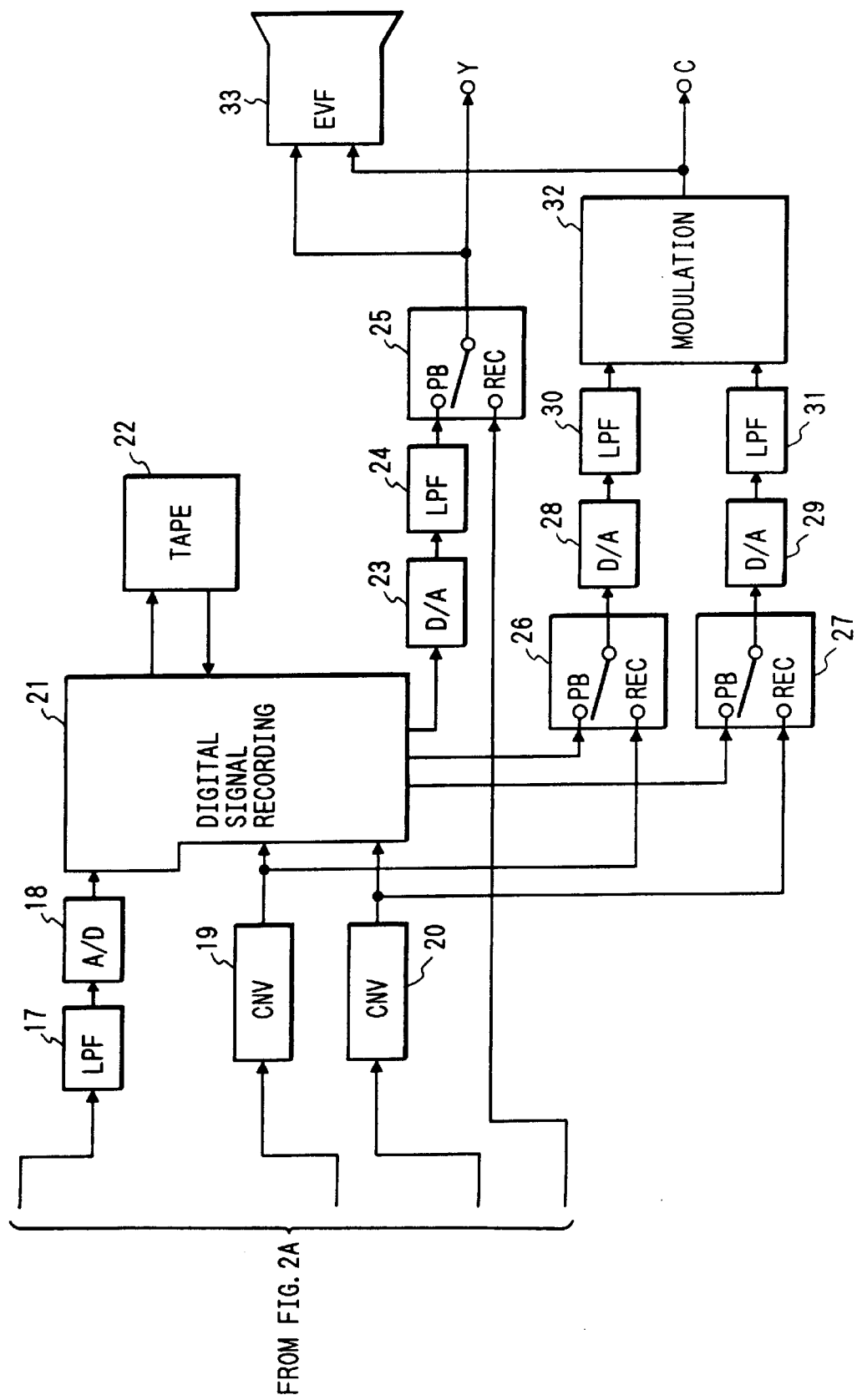
FIG. 2 which is comprised of FIGS. 2A and 2B is a block diagram showing a digital video camera apparatus according to the first embodiment of the present invention.

The preferred embodiments of a digital video camera apparatus according to the present invention will be described hereinafter with reference to the accompanying drawings. FIGS. 2A and 2B are a block diagram showing the arrangement of a video camera apparatus according to the first embodiment of the present invention.

As shown in FIGS. 2A and 2B, a video signal obtained via a lens element 1, a solid-state image pickup device 2, a correlation double sampling circuit 3, and a gain adjustment circuit 4 is sampled by an A/D converter 5 at a clock frequency (MCLK) of the solid-state image pickup device 2 to be converted into a digital signal.

A digital signal processing circuit 6 generates a digital luminance signal and digital color-difference signals. Thereafter, the digital luminance signal is supplied as a band-limited analog luminance signal to a switch circuit 14 via a D/A converter 12 and a low-pass filter 13. The digital color-difference signals are supplied to switch circuits 15 and 16.

When YC-separated input signals are externally input as a video signal, these signals are directly input to switch circuits 8 and 9. When a composite video signal is input as an externally input video signal, the composite video signal is separated into luminance and chrominance signal by a luminance/chrominance separation circuit 7, and the separated signals are input to the switch circuits 8 and 9. Of these switch circuits 8 and 9, the switch circuit 8 is arranged for selecting a luminance signal Y, and the switch circuit 9 is arranged for selecting a chrominance signal C.

The chrominance signal separated by the switch circuit 9 is supplied to an A/D converter 10. The chrominance signal is converted into a digital signal by the A/D converter 10 at a frequency four times the subcarrier frequency, and the digital chrominance signal is supplied to a demodulation device 11. The digital chrominance signal is converted into digital color-difference signals by the demodulation circuit 11.

The analog luminance signal and the digital color-difference signals from the camera, and the externally input analog luminance signal and digital color-difference signals are respectively selected by switch circuits 14 to 16. The frequency band of the analog luminance signal is limited by a low-pass filter 17, and the band-limited signal is supplied to an A/D converter 18 to be converted into a digital luminance signal. At this time, sampling is performed at the sampling frequency of a digital VTR.

The frequencies of the digital color-difference signals are converted by sampling frequency conversion circuits 19 and 20 from the clock frequency (MCLK) of the solid-state image pickup device 2 or the frequency four times the subcarrier frequency to the sampling frequency of the digital VTR.

The converted digital luminance and color-difference signals are supplied to a digital signal recording device 21, and are recorded on a magnetic tape 22 by the digital signal recording device 21. Thus, a digital video signal is recorded.

At this time, switch circuits 25 to 27 are switched to the REC side, and the analog luminance signal is directly output. The digital color-difference signals are converted into analog color-difference signals by D/A converters 28 and 29 which operate at the sampling frequency of the digital VTR, and the analog color-difference signals are modulated and converted into a chrominance signal by a modulation device 32. The chrominance signal is output. An EVF 33 performs a display operation using the output luminance and chrominance signals, and a displayed image is utilized for monitoring in an image pickup operation.

In a reproduction mode, the digital signal recording device 21 receives a signal reproduced from the magnetic tape 22, and generates digital reproduced luminance and color-difference signals. Of these reproduced signals, the reproduced luminance signal is converted into an analog luminance signal by a D/A converter 23 which operates at the sampling frequency of the digital VTR. Thereafter, the frequency band of the analog luminance signal is limited by a low-pass filter 24, thus obtaining an analog reproduced luminance signal.

Figure 3B:
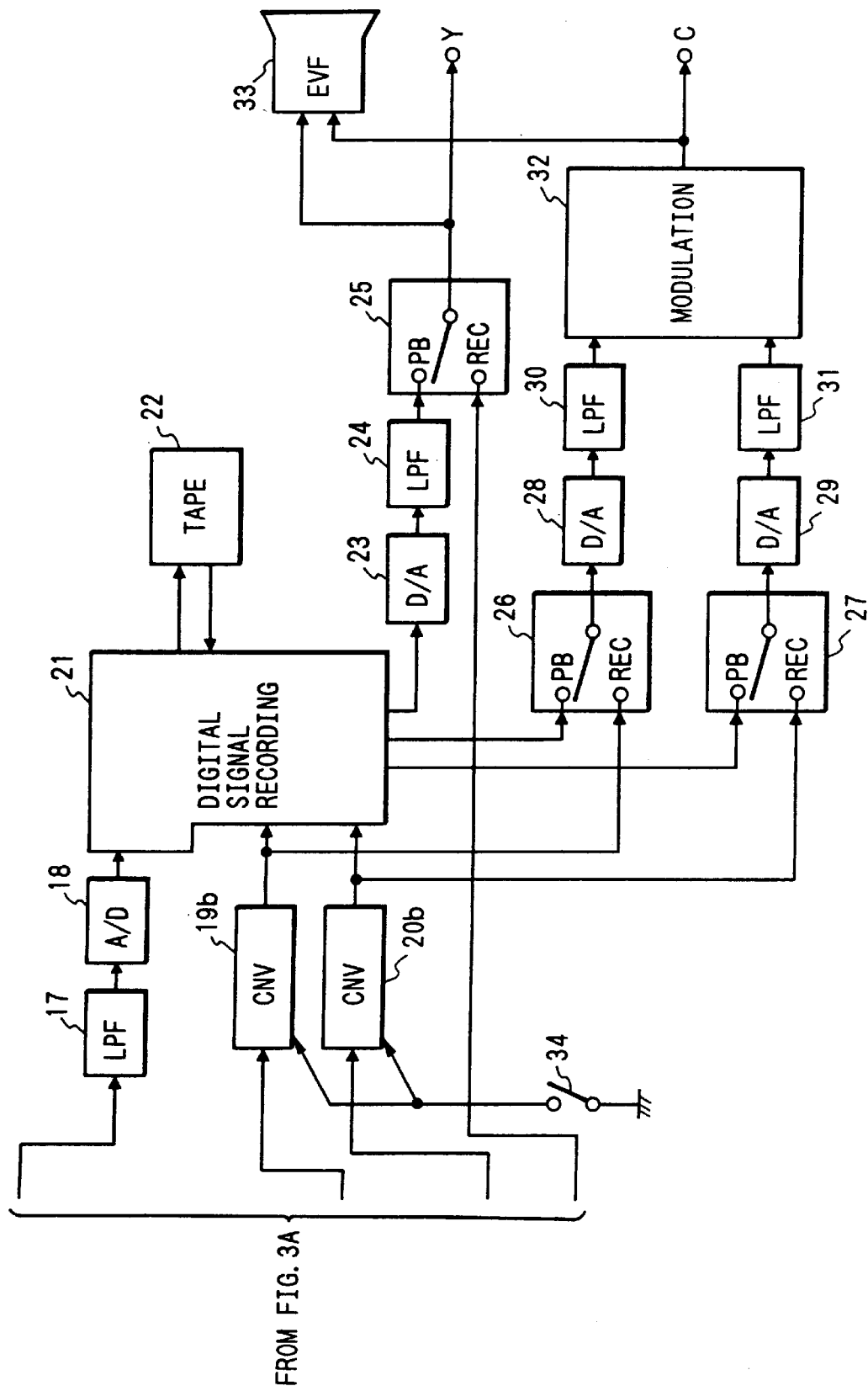
FIG. 3 which is comprised of FIGS. 3A and 3B is a block diagram showing a digital video camera apparatus according to the second embodiment of the present invention.

The second embodiment of the present invention will be described below with reference to FIGS. 3A and 3B. The same reference numerals in FIGS. 3A and 3B denote the same parts as in FIGS. 2A and 2B.

A video signal obtained via a lens element 1, a solid-state image pickup device 2, a correlation double sampling circuit 3, and a gain adjustment circuit 4 is sampled by an A/D converter 5 at a clock frequency (MCLK) of the solid-state image pickup device 2 to be converted into a digital signal.

A digital signal processing circuit 6 generates a digital luminance signal and digital color-difference signals. Thereafter, the digital luminance signal is supplied as a band-limited analog luminance signal to a digital signal recording device 21 via a D/A converter 12 and a low-pass filter 13 together with the digital color-difference signals.

When YC-separated input signals are externally input as a video signal, these signals are input to switch circuits 8 and 9. When a composite video signal is input as an externally input video signal, the composite video signal is separated into luminance and chrominance signal by a luminance/chrominance separation circuit 7, and the separated signals are input to the switch circuits 8 and 9. One of these video signals is selected by the switch circuits 8 and 9, and the selected video signal is supplied to subsequent circuits.

Thereafter, the chrominance signal is converted into a digital signal by an A/D converter 10 at a frequency four times the subcarrier frequency, and the digital signal is converted into digital color-difference signals by a demodulation device 11.

The analog luminance signal and the digital color-difference signals from a camera and the externally input analog luminance signal and digital color-difference signals are supplied to switch circuits 14 to 16, and signals selected by these switch circuits are supplied to subsequent circuits.

The frequency band of the analog luminance signal is limited by a low-pass filter 17, and the band-limited signal is converted into a digital luminance signal by an A/D converter 18. At this time, sampling is performed at the sampling frequency of a digital VTR.

The frequencies of the digital color-difference signals are converted by sampling frequency conversion circuits 19b and 20b from the clock frequency (MCLK) of the solid-state image pickup device 2 or the frequency four times the subcarrier frequency into the sampling frequency of the digital VTR.

At this time, a switch circuit 34 selects whether a connected device is a digital camera or an external input, and the sampling frequency conversion circuits 19b and 20b change coefficients based on the selection result so as to convert the clock frequency (MCLK) into the sampling frequency of the digital VTR or to convert the frequency four times the subcarrier frequency into the sampling frequency of the digital VTR.

Thus, even when the clock frequency (MCLK) is not equal to the frequency four times the subcarrier frequency (for example, in the case of an NTSC device using a solid-state image pickup element having 250,000 pixels), frequency conversion can be appropriately performed.

The digital signal recording device 21 records the converted digital luminance a nd color-difference signals on a magnetic tape 22. Thus, a digital video signal is recorded. At this time, switch circuits 25 to 27 are switched to the REC side, and the analog luminance signal is directly output.

The digital color-difference signals are converted into analog color-difference signals by D/A converters 28 and 29 which operate at the sampling frequency of the digital VTR, and thereafter, the frequency bands of the analog color-difference signals are limited by low-pass filters 30 and 31. The band-limited signals are modulated by a modulation device 32 to be converted into a chrominance signal. Thus, the chrominance signal is output. An EVF 33 performs a display operation using the output luminance and chrominance signals, and a displayed image is utilized for monitoring in an image pickup operation.

Furthermore, in a reproduction mode, the digital signal recording device 21 receives a signal reproduced from the magnetic tape 22, and generates digital reproduced luminance and color-difference signals. Of these reproduced signals, the reproduced luminance signal is converted into an analog luminance signal by a D/A converter 23 which operates at the sampling frequency of the digital VTR. Thereafter, the frequency band of the analog luminance signal is limited by a low-pass filter 24, thus obtaining an analog reproduced luminance signal.

At this time, the switch circuits 25 to 27 are switched to the PB side, and the analog luminance signal is directly output. The digital color-difference signals are converted into analog color-difference signals by the D/A converters 28 and 29 which operate at the sampling frequency of the digital VTR. Thereafter, the analog color-difference signals are modulated by the modulation device 32 into a chrominance signal. The chrominance signal is output as a reproduced video signal together with the luminance signal.

In each of the embodiments of the present invention, as described above, when a video signal obtained by A/D-converting a signal output from the solid-state image pickup element and processing the digital signal on a digital region, and a video signal input from an external input terminal are supplied to the digital signal recording device, and are recorded on a recording medium, a luminance signal and an externally input luminance signal are supplied to the digital signal recording device in a state of analog signals, and a chrominance signal is supplied thereto in a state of a digital signal. For this reason, the circuit arrangement of the digital video camera apparatus, which can select one of a video signal form the digital video camera and a video signal from the external input terminal, and can record the selected signal on a recording medium, can be simplified, and cost can be reduced.

Figure 4:
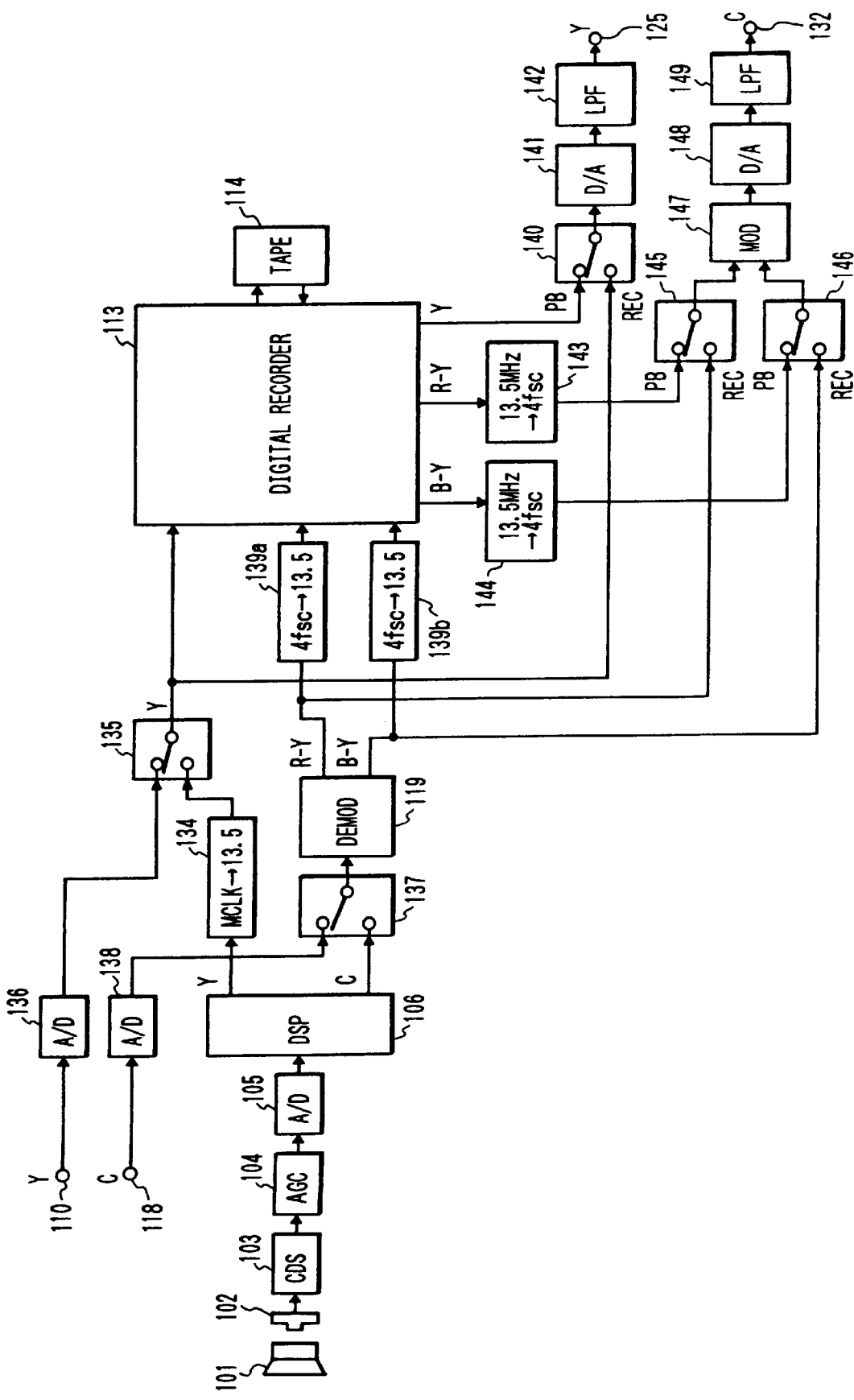
FIG. 4 is a block diagram showing the third embodiment of the present invention.

FIG. 4 shows the third embodiment of the present invention. Referring to FIG. 4, a video signal obtained via a lens element 101 and a solid-state image pickup element 102 is converted into a digital signal by an A/D converter 105 via a correlation double sampling circuit 103 and a gain adjustment circuit 104. The video signal is sampled by the A/D converter 105 at a clock frequency (MCLK) of the solid-state image pickup element 102. A digital signal processing circuit 106 generates a digital luminance signal Y and a digital chrominance signal C from the camera input signal.

The frequency of the digital luminance signal Y is converted by a frequency converter 134 from the clock frequency (MCLK) of the solid-state image pickup element 102 into a sampling frequency (about 13.5 MHz) of a digital signal recording/reproduction device (digital recorder) 113. Thereafter, the digital luminance signal is supplied to a selector 135.

The luminance signal Y from an external input terminal 110 is sampled at the sampling frequency (about 13.5 MHz) of the digital recorder 113 by an A/D converter 136 so as to be A/D-converted into a digital signal. Thereafter, the digital luminance signal is supplied to the selector 135. The selector 135 selects one of the camera input luminance signal Y and the externally input luminance signal Y, and supplies the selected luminance signal to the digital recorder 113.

On the other hand, the digital chrominance signal C generated by the digital signal processing circuit 106 is supplied to a selector 137. A chrominance signal C from an external input terminal 118 is sampled at a sampling frequency $4f_{sc}$ four times a subcarrier frequency $f_{sc}$ by an A/D converter 138 so as to be converted into a digital signal. The selector 137 selects one of the camera input chrominance signal C and the externally input chrominance signal C. The output from the selector 137 is demodulated by a demodulator 119, thus obtaining digital color-difference signals R-Y and B-Y. At this time, the sampling frequency of each color-difference signal is $4f_{sc}$, but the sampling frequency of the digital recorder 113 is about 13.5 MHz. Thus, the color-difference signals R-Y and B-Y are subjected to frequency conversion by frequency converters 139a and 139b. Thus, the digital color-difference signals having the sampling frequency of 13.5 MHz are input to the digital recorder 113, and are recorded on a tape 114 together with the digital luminance signal Y.

In a reproduction mode, a digital video signal recorded on the tape 114 is reproduced by the digital recorder 113. The digital reproduced luminance signal is converted into an analog signal by a D/A converter 141 at the sampling frequency of the digital recorder 113 via a selector 140, and the analog signal is output from an output terminal 125 as a luminance signal Y via a low-pass filter 142. Note that, in a recording mode, the output from the selector 135 is directly supplied to the selector 140 to monitor the luminance signal Y at the output terminal 125.

On the other hand, the reproduced digital color-difference signals R-Y and B-Y are subjected to frequency conversion by frequency converters 143 and 144, respectively. At this time, the sampling frequency is converted from the sampling frequency (13.5 MHz) of the digital recorder 113 to $4f_{sc}$. The frequency-converted color-difference signals are respectively supplied to selectors 145 and 146. These signals are modulated by a digital modulator 147 into a digital chrominance signal. The digital chrominance signal is converted into an analog signal by a D/A converter 148 at the sampling frequency $4f_{sc}$, and the analog chrominance signal is output from an output terminal 132 as a chrominance signal C via a low-pass filter 149. Note that, in the recording mode, the outputs from the demodulator 119 are directly supplied to the selectors 145 and 146 without converting their sampling frequency from $4f_{sc}$, thus monitoring the chrominance signal C at the output terminal 132.

Figure 5:
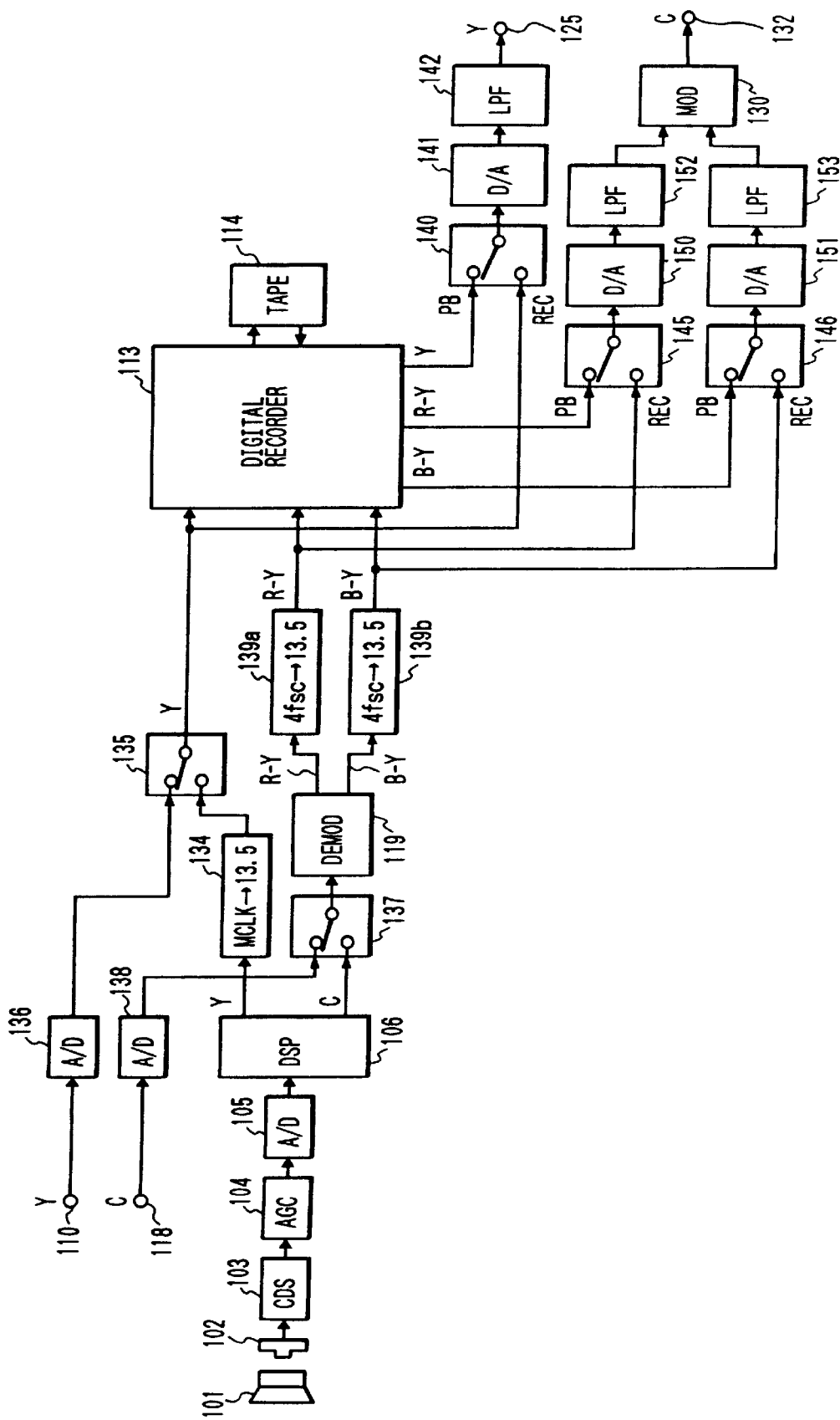
FIG. 5 is a block diagram showing the fourth embodiment of the present invention.

FIG. 5 shows the fourth embodiment of the present invention. The same reference numerals in FIG. 5 denote the same parts as in FIG. 4.

In this embodiment, the arrangement and operation in the recording mode, the arrangement and operation associated with the luminance signal Y in the reproduction mode are the same as those in FIG. 4. Therefore, the arrangement and operation associated with the chrominance signal in the reproduction mode will be explained below.

Digital reproduced color-difference signals R-Y and B-Y reproduced by a digital recorder 113 are respectively supplied to selectors 145 and 146. These signals are respectively converted into analog signals by D/A converters 150 and 151 at the sampling frequency of the digital recorder 113, and the analog signals are analog-modulated by a modulator 130 via low-pass filters 152 and 153, thus obtaining a chrominance signal C to be output to an output terminal 132. In the recording mode, the outputs from frequency converters 139a and 139b are supplied to the selectors 145 and 146, and after they are subjected to D/A conversion and modulation, the chrominance signal C at the output terminal 132 is monitored.

Figure 6:
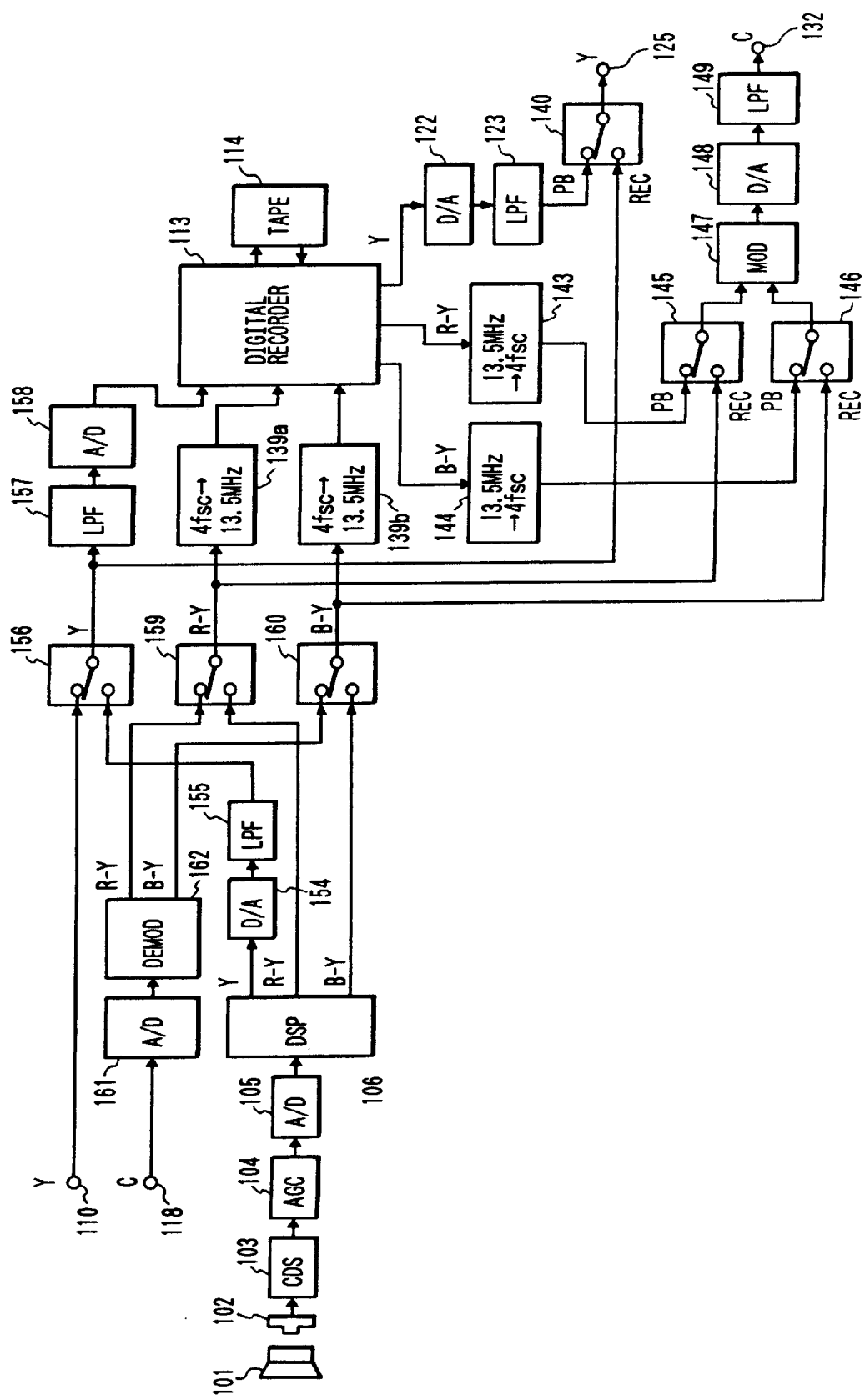
FIG. 6 is a block diagram showing the fifth embodiment of the present invention.

FIG. 6 shows the fifth embodiment of the present invention. The same reference numerals in FIG. 6 denote the same parts as in FIGS. 1A to 5. Referring to FIG. 6, a digital signal converted by an A/D converter 105 at a clock frequency (MCLK) of a solid-state image pickup element 102 is supplied to a digital signal processing circuit 106, thus generating a digital luminance signal Y and digital color-difference signals R-Y and B-Y.

The digital luminance signal Y is converted into an analog signal by a D/A converter 154 at the sampling frequency MCLK, and the analog signal is input to a selector 156 via a low-pass filter 155. A luminance signal Y at an external input terminal 110 is input as an analog signal to the selector 156. The selector 156 selects one of the camera input luminance signal Y and the externally input luminance signal Y. The selected signal is filtered through a low-pass filter 157, and is then converted into a digital signal by an A/D converter 158 at the sampling frequency (about 13.5 MHz) of a digital recorder 113. The digital signal is supplied to the digital recorder 113.

On the other hand, the digital color-difference signals R-Y and B-Y generated by the digital signal processing circuit 106 are respectively supplied as digital signals to selectors 159 and 160. A chrominance signal C at an external input terminal 118 is converted into a digital signal by an A/D converter 161, and the digital signal is input to a demodulator 162, thus generating externally input color-difference signals R-Y and B-Y. The selectors 159 and 160 select either the camera input color-difference signals or the externally input color-difference signals. At this time, the sampling frequency of each of the color-difference signals output from the selectors 159 and 160 is $4f_{sc}$, but the sampling frequency of the digital recorder 113 is 13.5 MHz. For this reason, the color-difference signals R-Y and B-Y are subjected to frequency conversion by frequency converters 139a and 139b, respectively. Thus, the digital color-difference signals having the sampling frequency of 13.5 MHz are input to the digital recorder 113, and are recorded on a tape 114 together with the luminance signal Y.

In a reproduction mode, a digital reproduced luminance signal reproduced from the tape 114 by the digital recorder 113 is converted into an analog signal by a D/A converter 122 at a sampling frequency (about 13.5 MHz), and the analog signal is input to a selector 140 via a low-pass filter 123. Then, the analog luminance signal is output from an output terminal 125 as a luminance signal Y. In a recording mode, the output from the selector 156 is directly supplied to the selector 140, thus monitoring the luminance signal Y at the output terminal 125.

On the other hand, the frequencies of reproduced digital reproduced color-difference signals R-Y and B-Y are converted by frequency converters 143 and 144 from the sampling frequency of 13.5 MHz to $4f_{sc}$. The frequency-converted color-difference signals are respectively supplied to selectors 145 and 146, and are modulated by a digital modulator 147, thus obtaining a chrominance signal. The chrominance signal is converted into an analog signal by a D/A converter 148 at the sampling frequency $4f_{sc}$, and the analog signal is filtered through a low-pass filter 149, thus obtaining a chrominance signal C at an output terminal 132. In the recording mode, the outputs from the selectors 159 and 160 are supplied to the selectors 145 and 146 without converting their sampling frequencies from $4f_{sc}$, thus monitoring the chrominance signal C at the output terminal 132.

Figure 7:
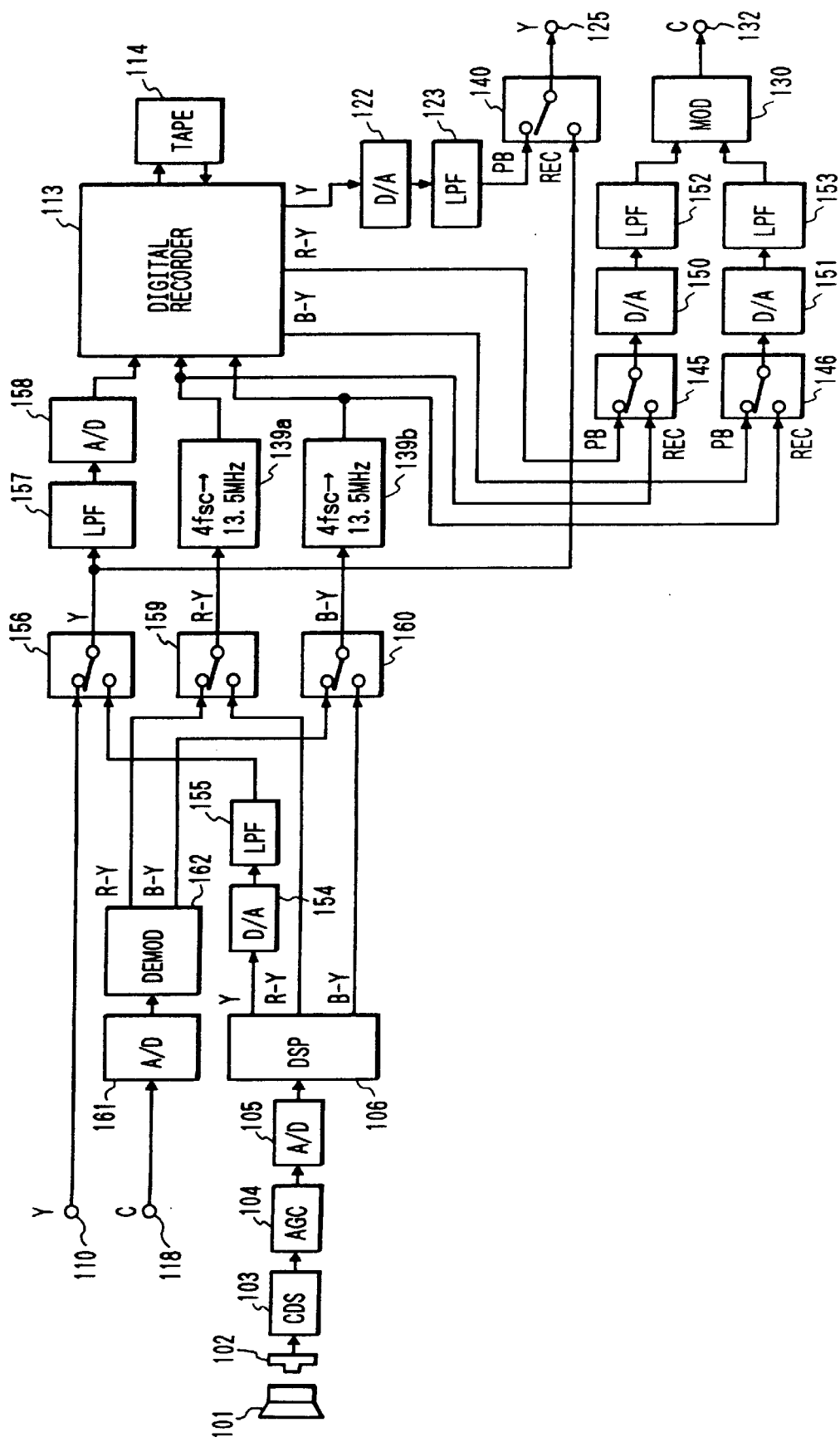
FIG. 7 is a block diagram showing the sixth embodiment of the present invention.

FIG. 7 shows the sixth embodiment of the present invention. The same reference numerals in FIG. 7 denote the same parts as in FIGS. 1A to 6.

In this embodiment, the arrangement and operation in the recording mode, the arrangement and operation associated with the luminance signal Y in the reproduction mode are the same as those in the fifth embodiment. Therefore, the arrangement and operation associated with the chrominance signal in the reproduction mode will be explained below.

Referring to FIG. 7, digital reproduced color-difference signals R-Y and B-Y reproduced by a digital recorder 113 are input to selectors 145 and 146. These signals are converted into analog signals by D/A converters 150 and 151 at a sampling frequency of 13.5 MHz, and the analog signals are filtered through low-pass filters 152 and 153. The filtered signals are then modulated by a modulator 130, and the modulated signal is output to an output terminal 132. In a recording mode, the outputs from frequency converters 139a and 139b are directly supplied to the selectors 145 and 146, thus monitoring a chrominance signal C at the output terminal 132.

As described above, in the third embodiment, an externally input luminance signal to be supplied to the digital recorder is A/D-converted at the sampling frequency of the digital recorder, and an externally input chrominance signal to be supplied to the digital recorder is A/D-converted at a frequency four times the subcarrier frequency.

In the fourth embodiment, color-difference signals from a camera unit are supplied to the modulator without changing their frequency from the sampling frequency $4f_{sc}$. When a video signal is output, the sampling frequency of color-difference output signals from the digital recorder is converted into $4f_{sc}$, and these color-difference signals are modulated in a digital region to generate a chrominance signal.

In the fifth embodiment, the sampling frequency of input color-difference signals R-Y and B-Y is converted from $4f_{sc}$ into the sampling frequency of the digital recorder. In addition, when a video signal is output, digital color-difference signals are D/A-converted at the sampling frequency, and the analog color-difference signals are modulated in an analog region to generate a chrominance signal.

Therefore, according to these embodiments, the number of components can be decreased, and an existing digital camera and an existing digital signal recording/reproduction device such as a digital VTR can be easily connected.

Figure 8B:
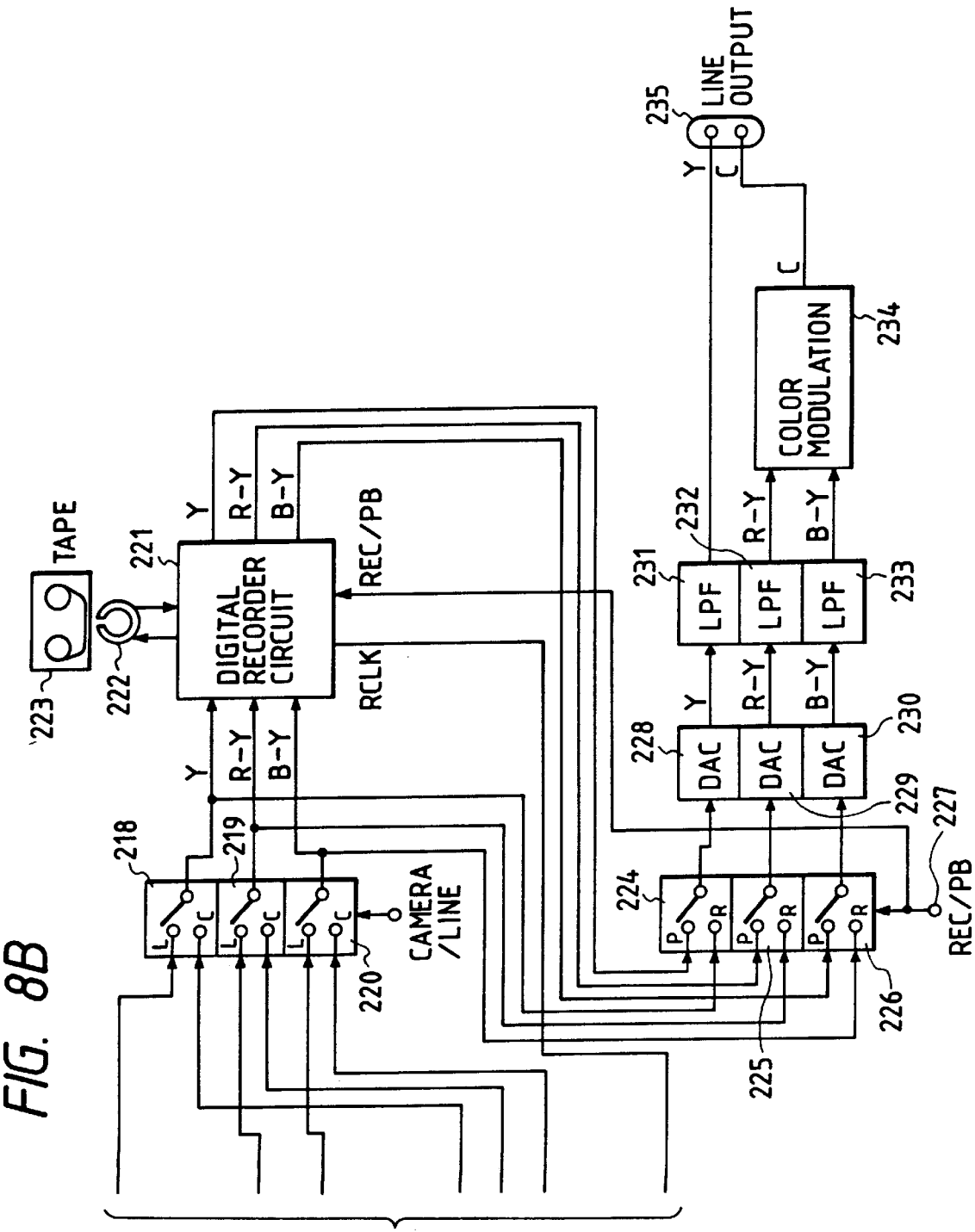
FIG. 8 which is comprised of FIGS. 8A and 8B is a block diagram showing an image pickup recording apparatus according to the seventh embodiment of the present invention.

FIGS. 8A and 8B are a block diagram showing the arrangement of an image pickup recording apparatus according to the seventh embodiment of the present invention. Referring to FIGS. 8A and 8B, an image pickup lens 201 includes a diaphragm and an optical filter.

The apparatus shown in FIGS. 8A and 8B includes a CCD 202 as a color image pickup element, and a camera timing generator 203. The camera timing generator 203 generates timing pulses necessary for the CCD 202, a signal processing circuit (to be described later), and the like. The outputs from the CCD 202 are converted into a continuous output by a sample & hold (S/H) circuit 204.

The apparatus includes A/D converters 205, 213, 215, and 216, and a camera signal processing circuit 206. The camera signal processing circuit 206 performs filtering, color separation, gamma correction, gain adjustment, clipping, and the like by digital calculations. The apparatus includes an electronic zoom circuit 207 for enlarging/reducing an image using a memory, Y (luminance)-C (chrominance) separated external video signal input terminals 208, and an external video input terminal 209 for a composite video signal.

The apparatus includes a YC separation circuit 210 for extracting Y and C signals from an input composite video signal, switch circuits 211 and 212 for switching the types of externally input signals in accordance with YC-separated (S) signals/composite (CO) signal, and a color demodulation circuit 214 for separating and demodulating color-difference signals R-Y and B-Y from the input C signal.

The apparatus includes a zoom terminal 217 for inputting a zoom signal ZOOM, switch circuits 218, 219, and 220 for switching the types of input signals in accordance with a switching signal CAMERA (image pickup signal)/LINE (external input), and a digital recorder circuit 221 for performing signal processing such as data compression/expansion, digital modulation/demodulation, and the like.

The apparatus includes a recording/reproduction head (magnetic head) 222, a digital video tape 223, switch circuits 224, 225, and 226 for switching the types of output signals in accordance with a switching signal REC (recording)/PB (reproduction), D/A converters 228, 229, and 230, low-pass filters 231, 232, and 233, a color modulation circuit 234 for receiving color-difference signals R-Y and B-Y and outputting a modulated chrominance signal C, and YC separated video output terminals 235.

In the image pickup recording apparatus of this embodiment with the above-mentioned arrangement, when the switch circuits 218, 219, 220, 224, 225, and 226 are switched in accordance with signals CAMERA/LINE and REC/PB generated by a control signal (not shown) in FIGS. 8A and 8B, three major modes, i.e., camera recording, external input recording, and reproduction modes are realized. Operations in these modes will be described in turn below.

The camera recording mode will be described below. In this mode, the switch circuits 218, 219, and 220 are connected to the CAMERA (C) side, and the switch circuits 224, 225, and 226 are connected to the REC (R) side.

An object image formed on the image pickup surface of the CCD 202 by the image pickup lens 201 is photoelectrically converted by the CCD 202 into electrical signals, and the electrical signals are sequentially read out according to a driving signal generated by the camera timing generator 203, thus obtaining image pickup signals. The image pickup signals are converted by the S/H circuit 204 into a continuous image pickup signal, and this signal is converted into a digital image pickup signal by the A/D converter 205.

The digital image pickup signal is subjected to the above-mentioned signal processing, i.e., filtering, color separation, gamma correction, clipping, and the like, by the camera signal processing circuit 206, thus obtaining a luminance signal Y and color-difference signals R-Y and B-Y. These signals are then input to the electronic zoom circuit 207, and are subjected to enlargement or reduction processing according to a zoom signal ZOOM input from the zoom terminal 217. The processed signals are then input to the digital recorder circuit 221 via the switch circuits 218, 219, and 220.

In the digital recorder circuit 221, the input signals are subjected to processing such as data compression, digital modulation, and the like. The digital recording signal output from the circuit 221 is recorded on the digital video tape 223 via the magnetic head 222.

The outputs from the switch circuits 218, 219, and 220 are respectively supplied to the D/A converters 228, 229, and 230 via the switch circuits 224, 225, and 226, and are D/A-converted by these D/A converters 228, 229, and 230.

The D/A-converted outputs from the switch circuits 218, 219, and 220 are supplied to the low-pass filters 231, 232, and 233, and low-frequency signals are extracted therefrom. The output from the low-pass filter 231 is directly output as a luminance (Y) signal from the corresponding output terminal 235 to an external device such as a television monitor (not shown) as a monitor signal.

The outputs from the low-pass filters 232 and 233 are balanced-modulated by a color subcarrier in the color modulation circuit 234, thus obtaining a chrominance signal C. The chrominance signal C is output from the corresponding output terminal 235 together with the above-mentioned Y signal. Note that the electronic zoom circuit 207 receives synchronization signals HD and VD generated by the camera timing generator 203, and operates in synchronism with these signals.

At this time, as a clock signal for operating the respective units, the CCD 202, the S/H circuit 204, the A/D converter 205, and the camera signal processing circuit 206 use a camera clock (to be referred to as a CCLK hereinafter) generated by the camera timing generator 203.

In the electronic zoom circuit 207, the former half circuit portion uses the CCLK, and the latter half circuit portion uses a recorder clock (to be referred to as RCLK hereinafter) generated by the digital recorder circuit 221. At the joint portion of these two circuit portions, the clock rate conversion is performed. Furthermore, the digital recorder circuit 221, and the D/A converters 228, 229, and 230 use the RCLK.

The reason why different clock rates are used is that the CCD 202 and the like use a reference clock frequency (for example, 10 MHz in the case of a CCD having 250,000 pixels; about 14 MHz in the case of a CCD having 380,000 pixels) according to the number of pixels of the CCD, and the digital recorder circuit 221 uses a reference clock frequency (e.g., 13.5 MHz) determined by its recording format.

Therefore, in this case, the clock frequency must be converted between these two frequencies. Upon conversion of the clock frequency, when the frequency is converted in the electronic zoom circuit 207, as shown in FIGS. 8A and 8B, a memory and an interpolation circuit included in the electronic zoom circuit can be commonly used by other circuits, thus simplifying the arrangement of the overall apparatus.

The external input recording mode will be described below. In this mode, the switch circuits 218, 219, and 220 are connected to the LINE (L) side, and the switch circuits 224, 225, and 226 are connected to the REC (R) side.

When YC-separated signals are input as an externally input signal, these signals are input from the S input terminals 208. In this case, a Y signal is supplied to the A/D converter 213 via the switch circuit 211, and is A/D-converted into a digital Y signal.

A C signal is supplied to the color demodulation circuit 214 via the switch circuit 212, and is subjected to color demodulation, thus obtaining color-difference signals R-Y and B-Y. Then, these color-difference signals are respectively A/D-converted into digital color-difference signals R-Y and B-Y by the A/D converters 215 and 216.

When an externally input signal is a composite video signal CO, it is input from the composite signal external input terminal 209. The composite video signal is separated into Y and C signals by the YC separation circuit 210, and the Y and C signals are respectively converted into a digital Y signal and digital color-difference signals R-Y and B-Y by the color demodulation circuit 214 and the A/D converters 213, 215, and 216 via the switch circuits 211 and 212, in the same manner as described above.

These signals are input to the digital recorder circuit 221 via the switch circuits 218, 219, and 220, and are recorded on the digital video tape 223 via the magnetic head 222.

The outputs from the switch circuits 218, 219, and 220 are output from the video signal output terminals 235 as monitor signals like in the camera recording mode.

At this time, as a clock signal for operating the respective units, the A/D converters 213, 215, and 216, the digital recorder circuit 221, and the D/A converters 228, 229, and 230 use the RCLK.

As described above, since the digital recorder circuit 221 uses the reference clock frequency determined by its recording format, the A/D converters 213, 215, and 216 are also operated using the same clock as the recorder circuit 221, thus simplifying the arrangement of the overall apparatus.

The reproduction mode will be described below. In this case, the switch circuits 224, 225, and 226 are connected to the PB (P) side. A digital video signal recorded on the digital video tape 223 is reproduced by the magnetic head 222, and is converted into an electrical signal. The electrical signal is supplied to the digital recorder circuit 221, and is subjected to processing such as digital demodulation, digital expansion, and the like, thus generating digital video signals Y, R-Y, and B-Y.

These signals are output as monitor signals from the video signal output terminals 235 in the same manner as in the above-mentioned two modes. At this time, as a clock signal for operating the respective units, the digital recorder circuit 221, and the D/A converters 228, 229, and 230 use the RCLK.

In this embodiment, since a camera signal processing system is operated using a clock optimal for the CCD and its processing system, a signal with high image quality can be obtained. Since an externally input signal processing system directly uses the clock of the digital recorder circuit, its circuit arrangement can be simplified. In particular, oven when a synchronization signal of an externally input signal suffers from a temporal change component (jitter), the influence of the jitter can be minimized.

Figure 9:
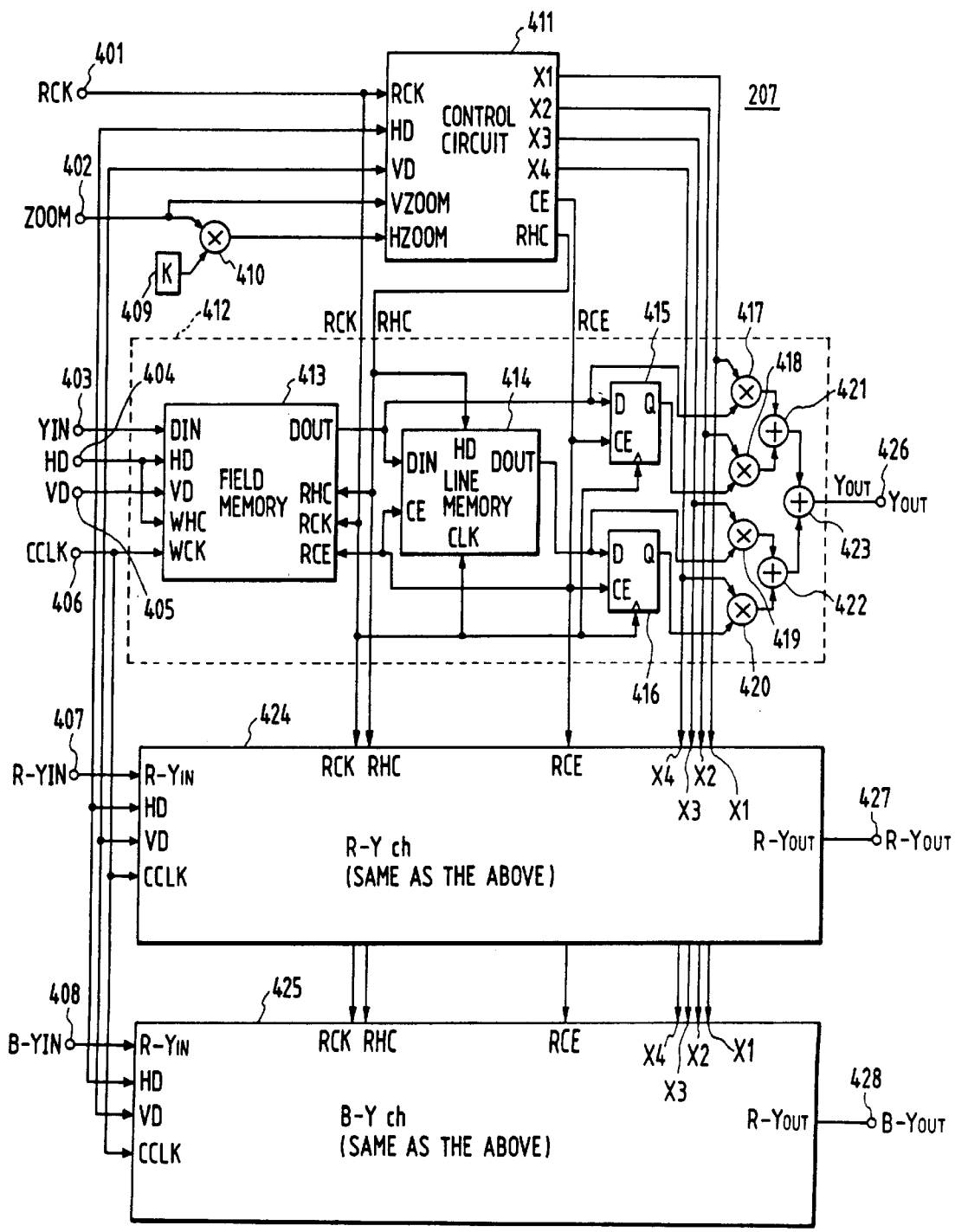
FIG. 9 is a circuit diagram showing in detail the arrangement of an electronic zoom circuit in FIGS. 8A and 8B.

FIG. 9 shows the detailed arrangement of he electronic zoom circuit 207 in the embodiment shown in FIGS. 8A and 8B. Referring to FIG. 9, the digital zoom circuit 207 comprises input terminals 401 to 408, a coefficient circuit 409, a multiplier 410, a control circuit 411, a zoom processing circuit 412 for performing enlargement processing of one signal, and output terminals 426, 427, and 428. The zoom processing circuit 412 includes a field memory 413 for memorizing an image signal for one vertical period, a line memory 414 for memorizing an image signal for one horizontal period, flip-flops (FFs) 415 and 416 each for delaying an image signal for one pixel, multipliers 417, 418, 419, and 420, and adders 421, 422, and 423.

The circuit 207 also comprises zoom processing circuits 424 and 425, which are the same as the circuit 412. In FIG. 9, these circuits 424 and 425 are not illustrated in detail for the sake of simplicity.

Of signals in this circuit, an image signal uses signal lines corresponding to its data width, e.g., 8 bits. However, these signal lines for the image signal are illustrated as a single line for the sake of simplicity.

A zoom signal ZOOM input from the zoom signal input terminal 402 is input to the control circuit 411 as a vertical zoom coefficient VZOOM, and is also input to the multiplier 410.

The other input terminal of the multiplier 410 receives a coefficient signal from the coefficient circuit 409. The coefficient circuit 409 stores a ratio FRCLK/FCCLK between a frequency FCCLK of the CCLK supplied from the camera timing generator 203 in FIGS. 8A and 8B and a frequency FRCLK of the RCLK supplied from the digital recorder circuit 221. A product between this value and the zoom signal is output from the multiplier 410, and is supplied to the control circuit 411 as a horizontal zoom coefficient HZOOM.

The control circuit 411 calculates the position on the screen based on input signals HD, VD, and RCK, and generates interpolation coefficients X1, X2, X3, and X4, a horizontal clock enable signal CE, and a read horizontal synchronization signal RHD. The circuit 411 controls the operation of the electronic zoom circuit 207 using these signals.

A luminance signal Y input from the Y input terminal 403 is input to the zoom processing circuit 412, and a signal for one vertical period is stored in the field memory 413. The field memory 413 is a memory called a dual-port memory. The memory 413 receives an input image signal DIN in synchronism with a clock WCK, the horizontal synchronization signal HD, the vertical synchronization signal VD, and a horizontal synchronization enable signal WHC for the write mode. Upon reception of a clock RCK, a horizontal synchronization enable signal RHC, and a clock enable signal RCE for the read mode, the memory 413 outputs an output image signal DOUT according to these signals. The output from the memory 413 is input to a data input terminal DIN of the line memory 414.

The line memory 414 stores an input signal in accordance with the horizontal synchronization signal HD and the clock enable signal CE, and outputs the stored signal from a terminal DOUT.

The output signals from the field memory 413 and the line memory 414 are respectively input to the multipliers 417 and 419, and are delayed by one pixel by the flip-flops 415 and 416. The delayed outputs are respectively input to the multipliers 418 and 420.

The multipliers 417, 418, 419, and 420 respectively receive the outputs X1, X2, X3, and X4 from the control circuit 411 at their other terminals, and product signals with these outputs are added to each other by the adders 421, 422, and 423 to obtain a Y output signal YOUT. The signal YOUT is output from the Y output terminal 426.

Color-difference signals R-Y and B-Y are respectively input from the input terminals 407 and 408, are processed by the zoom processing circuits 424 and 425 in the same manner as the above-mentioned Y signal, and are respectively output from the color-difference output terminals 427 and 428.

This operation will be described in detail below. For the sake of simplicity, the operation of the Y signal system when the value of the coefficient circuit 409 is "1" and the value of the zoom signal ZOOM is "2" will be explained below. The output RHC from the control circuit 411 is generated once per two horizontal periods 2H, and the field memory 413 outputs the signal of the same horizontal line for two horizontal periods.

Furthermore, since the horizontal clock enable signal RCE is generated once per two RCLK clocks, the same output is obtained for every two output pixels. The line memory 414 outputs signals obtained by delaying these pixels by one horizontal period.

Since the flip-flops 415 and 416 output signals obtained by delaying these pixels by one horizontal pixel, signals of four pixels, i.e., the current pixel P(x,y), its left neighboring pixel P(x-1,y), its upper neighboring pixel P(x,y-1), and its upper left neighboring pixel (x-1,y-1), are obtained in the multipliers 417 to 420 for every two clock periods.

At the first clock in the two clock periods, the other inputs of the multipliers 417 to 420 receive:

X1=0, X2=0, X3=0, and X4=1,
and, a signal of the upper left neighboring pixel of the current pixel is extracted.

At the next clock, the inputs are:
X1=0, X2=0, X3=0.5, and X4=0.5,
and, an average value of the upper left and upper pixels is extracted.

In the next horizontal period, since the RHC is not output, as described above, the signal of the same pixel is obtained at the same horizontal position as the above-mentioned position. Therefore, the multipliers 417 to 420 receive the same signals as in the previous line for every two RCLK clock periods in the same manner as in the previous line.

At this time, at the first clock in the two clock periods, the other inputs of the multipliers 417 to 420 receive:

X1=0, X2=0.5, X3=0, and X4=0.5,
and, an average value of the upper left and left pixels is extracted.

At the next clock, the inputs are:
X1=0.25, X2=0.25, X3=0.25, and X4=0.25,
and, an average value of the four pixels, i.e., the upper left, upper, left, and current pixels, is extracted.

In this manner, a signal between adjacent pixels is obtained by linear interpolation, and a ×2 image is obtained. When the value of the zoom signal ZOOM is other than 2, or when the value of the coefficient circuit 409 is not 1, values different from the above-mentioned values are input to the terminals VZOOM and HZOOM of the control circuit. However, an image which is obtained by enlarging an input signal to ×HZOOM in the horizontal direction and to ×VZOOM in the vertical direction, and is linearly interpolated is obtained from the output of the adder 423 in the same manner as the above-mentioned operation.

The zoom processing circuits 424 and 425 output image signals obtained by enlarging the color-difference signals R-Y and B-Y in the horizontal and vertical directions in accordance with the zoom signal ZOOM and the output from the coefficient circuit 409 in the same manner as described above.

In this embodiment, since enlargement of an image and conversion of the clock rate are performed by linear interpolation correction, deterioration of an image caused by processing can be minimized. Since the conversion ratio of the clock rate and the zoom ratio can be independently input, if different clock rates are used, only the conversion ratio of the clock rates need only be changed, and the circuit arrangement need not be changed.

Figure 10:
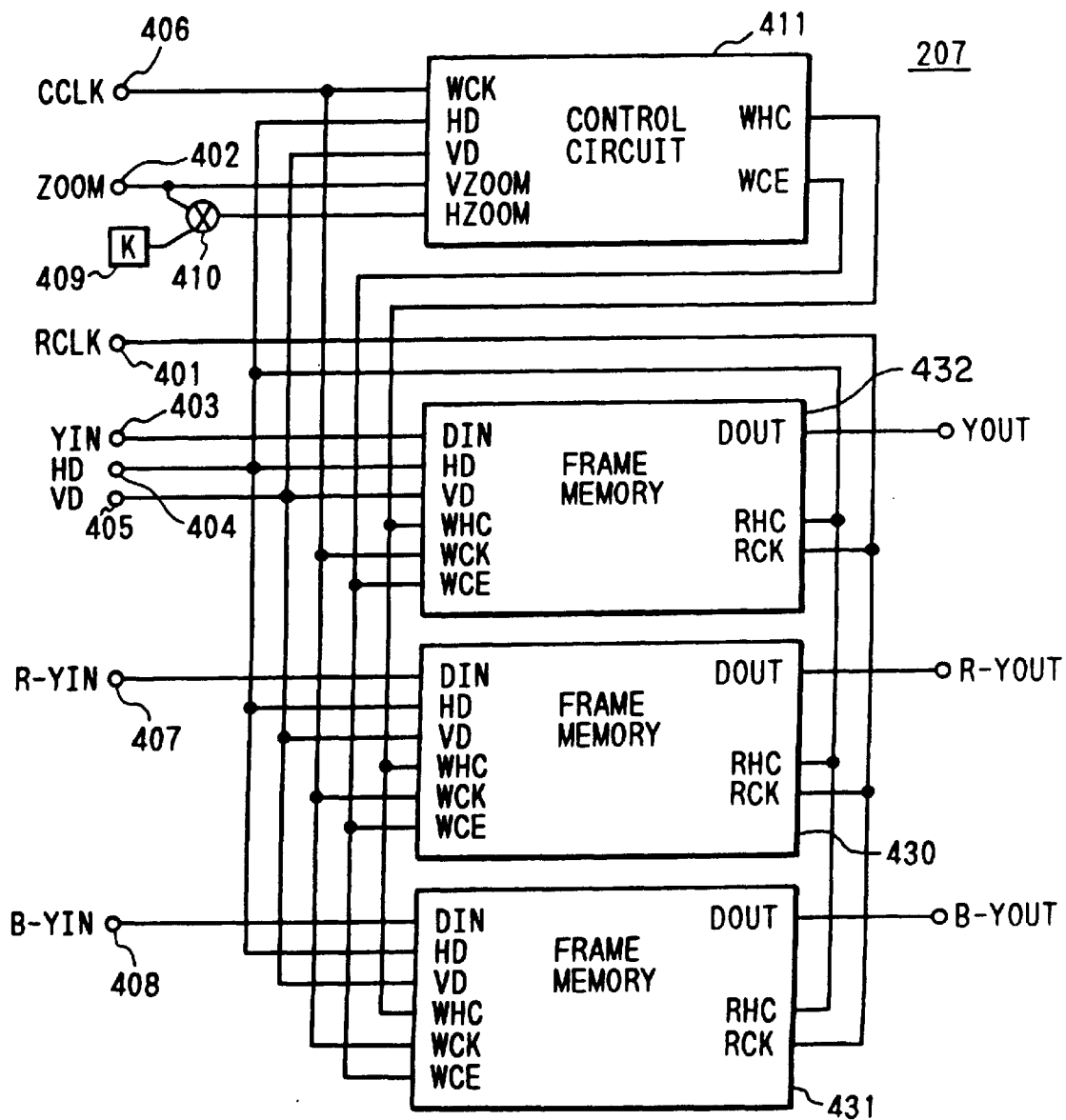
FIG. 10 is a circuit diagram showing in detail another arrangement of the electronic zoom circuit in FIGS. 8A and 8B.

FIG. 10 is a detailed block diagram showing the second arrangement of the electronic zoom circuit 207 in the embodiment of the present invention. The same reference numerals in FIG. 10 denote the same or corresponding parts as in FIG. 9. Referring to FIG. 10, the circuit 207 comprises frame memories 430 and 431 which are the same as the frame memory 432.

The control circuit 411 receives the CCLK, and also receives, at the terminal VZOOM, the zoom signal ZOOM, and at the terminal HZOOM, a value obtained by multiplying the zoom signal ZOOM with the output from the coefficient circuit 409 by the multiplier 410 as in FIG. 9.

The output WHC from the control circuit 411 is a write horizontal synchronization enable signal for the frame memories 432, 430, and 431, and the output WCE is a write clock enable signal for the frame memories 432, 430, and 431. These outputs are input to the frame memories, and control their operations.

The operation of this arrangement will be described below. For the sake of simplicity, the operation of the Y signal system when the output from the coefficient circuit 409 is "1" and the value of the zoom signal ZOOM is "0.5" will be explained below.

The output WHC from the control circuit 411 is generated once per two horizontal periods 2H, and in the frame memory 432, a signal is written at the same horizontal position for two horizontal periods.

Furthermore, since the write clock enable signal WCE is generated once per two CCLK clocks, signals are written at the same positions for every two input pixels.

At the read side, since the horizontal synchronization signal HD is input as the read horizontal synchronization enable signal, and the RCLK is input as the read clock, an image obtained by reducing an input image to ½ in the horizontal and vertical direction is read out.

In this manner, since pixel signals are thinned out to ½, an image is reduced to ½.

When the value of the zoom signal ZOOM is other than 0.5, or when the value of the coefficient circuit 409 is not 1, values different from the above-mentioned values are input to the terminals VZOOM and HZOOM of the control circuit. However, an image which is obtained by reducing an input signal to ×HZOOM in the horizontal direction and to ×VZOOM in the vertical direction is obtained from the output of the frame memory 432 in the same manner as the above-mentioned operation.

The frame memories 430 and 431 output image signals obtained by reducing the color-difference signals R-Y and E-Y in the horizontal and vertical directions in accordance with the signal ZOOM and the output from the coefficient circuit 409 in the same manner as described above.

In this case, since enlargement of an image and conversion of the clock rate can be performed without arranging any external circuit in addition to the frame memories, a decrease in mounting area, low power consumption, and low cost can be realized.

The circuits shown in FIGS. 9 and 10 respectively exemplify the arrangements for realizing enlargement and reduction of an image. When these circuits are combined and their operations are switched via a switch, the arrangement for realizing reduction and enlargement by a single circuit can be easily obtained. In this case, when the control circuit and the field memories are commonly used by enlargement and reduction circuits, a switch circuit need only be added to the circuit shown in FIG. 9, and an increase in the number of circuit components can be minimized.

Furthermore, when a means for controlling read/write operations of the field memories used in this circuit is added, special effects such as a still effect, a stroboscopic effect, and the like can be easily realized.

Figure 11B:
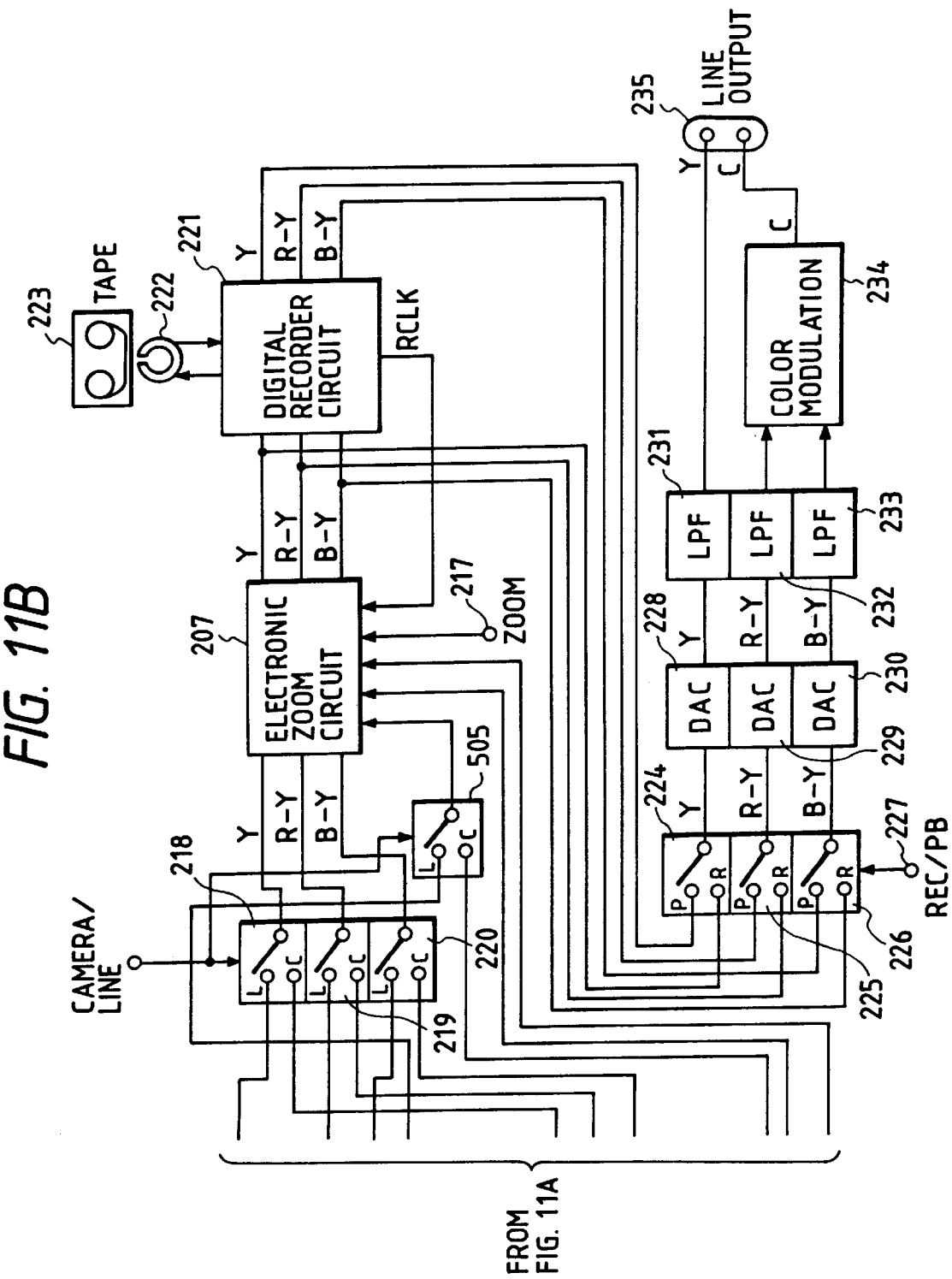
FIG. 11 which is comprised of FIGS. 11A and 11B is a block diagram showing the eighth embodiment of the present invention.

FIGS. 11A and 11B are a block diagram showing the arrangement according to the eighth embodiment of the present invention. The same reference numerals in FIGS. 11A and 11B denote the same or corresponding parts as in FIGS. 8A and 8B.

Referring to FIGS. 11A and 11B, an apparatus comprises an AGC circuit 501 for varying the gain of an input signal, and a synchronization separation circuit 502 for separating a synchronization signal from an input digital Y signal with a synchronization signal, and generating a clock LCLK synchronized with the separated synchronization signal.

The apparatus also comprises switch circuits 503 and 504 for selecting an input signal in accordance with a switching signal S/CO as in the switch circuit 211, and a switch circuit 505 for switching an input signal in accordance with a switching signal C/L as in the switch circuits 218, 219, and 220.

Note that the YC separation circuit 210 and the color demodulation circuit 214 are arranged to process digital signals unlike in FIGS. 8A and 8B.

Referring to FIGS. 11A and 11B, when the switch circuits 218, 219, 220, 224, 225, and 226 are switched in accordance with signals CAMERA/LINE and REC/PB generated by a control signal (not shown), the apparatus operates in three major modes, i.e., camera recording, external input recording, and reproduction modes. Operations in these modes will be described in turn below.

The camera recording mode will be described below. In this mode, the switch circuits 218, 219, 220, and 505 are connected to the CAMERA (C) side, and the switch circuits 224, 225, and 226 are connected to the REC (R) side.

The operation from the lens 201 to the camera signal processing circuit 206 is the same as that of the circuit shown in FIGS. 8A and 8B.

A luminance signal Y and color-difference signals R-Y and B-Y output from the camera signal processing circuit 206 are input to the electronic zoom circuit 207 via the switch circuits 218, 219, and 220. At this time, the CCLK generated from the camera timing generator 203 is input to the electronic zoom circuit 207 via the switch circuit 505.

In the electronic zoom circuit 207, enlargement or reduction processing is performed at a magnification according to a zoom signal input from the zoom terminal 217 as in FIGS. 8A and 8B. At the same time, the former half circuit portion uses the CCLK, the latter half circuit portion uses the RCLK generated by the digital recorder circuit 221, and conversion of the clock rates is performed at a joint portion between these circuit portions. The outputs from the electronic zoom circuit are input to the digital recorder circuit 221 in the same manner as in FIGS. 8A and 8B, and thereafter, the same operation as in FIGS. 8A and 8B is performed.

The external input recording mode will be described below. In this mode, the switch circuits 218, 219, 220, and 505 are connected to the LINE (L) side, and the switch circuits 224, 225, and 226 are connected to the REC (R) side.

When YC separated signals are input as an externally input signal, these signals are input from the S input terminals 208. A Y signal is supplied to the AGC circuit 501 via the switch circuit 211, and its signal level is adjusted in accordance with a synchronization signal SYNC (to be described later), so that the synchronization signal portion has a predetermined level. The output from the AGC circuit 501 is A/D-converted by the A/D converter 213.

The digital Y signal as the output from the A/D converter 213 is input to the electronic zoom circuit 207 via the switch circuits 503 and 218. The digital Y signal is also input to the synchronization separation circuit 502, thus generating a synchronization signal SYNC and an external input clock LCLK synchronized with the signal SYNC.

The external input clock LCLK is generated by, e.g., a phase-locked loop (PLL), to have a frequency corresponding to an integer multiple of the horizontal synchronization frequency in the synchronization signal and the color subcarrier frequency. The clock LCLK is supplied to the electronic zoom circuit 207 via the A/D converters 213 and 215, the YC separation circuit 210, the color demodulation circuit 214, and the switch circuit 505.

A chrominance signal C input from the corresponding S input terminal 208 is A/D-converted into a digital chrominance signal by the A/D converter 215, and the digital chrominance signal is supplied to the color demodulation circuit 214 via the switch circuit 504. The digital chrominance signal is demodulated into color-difference signals R-Y and B-Y by the circuit 214, and the color-difference signals R-Y and B-Y are input to the electronic zoom circuit 207 via the switch circuits 219 and 220, respectively.

When an externally input signal is a composite video signal CO, the signal CO is input from the composite signal external input terminal 209, and is supplied to the AGC circuit 501 via the switch circuit 211. The signal level of the composite video signal CO is adjusted by the circuit 501 in accordance with the synchronization signal, so that its synchronization signal portion has a predetermined level, in the same manner as described above. The output from the AGC circuit 501 is A/D-converted by the A/D converter 213.

The digital composite video signal as the output from the A/D converter 213 is separated into Y and C signals by the YC separation circuit 210. Of these signals, the Y signal is input to the electronic zoom circuit 207 via the switch circuits 503 and 218.

Of the outputs from the YC separation circuit 210, the chrominance signal C is demodulated into digital color-difference signals R-Y and B-Y by the color demodulation circuit 214 via the switch circuit 504 in the same manner as described above. The color-difference signals are input to the electronic zoom circuit 207 via the switch circuits 219 and 220.

In the electronic zoom circuit 207, enlargement or reduction processing is performed at a magnification according to a zoom signal input from the zoom terminal 217 as in FIGS. 8A and 8B. At the same time, the former half circuit portion uses the LCLK, the latter half circuit portion uses the RCLK generated by the digital recorder circuit 221, and conversion of the clock rates is performed at a joint portion between these circuit portions. The outputs from the electronic zoom circuit 207 are input to the digital recorder circuit 221 in the same manner as in FIGS. 8A and 8B, and thereafter, the same operation as in FIGS. 8A and 8B is performed.

Since the operation in the reproduction mode is the same as that in FIGS. 8A and 8B, a detailed description thereof will be omitted.

In the arrangement of this embodiment, of externally input signals, the Y signal of S input signals, and the composite input signal are subjected to level adjustment of the single AGC circuit. For this reason, even when the level of an externally input signal does not have a normal value, or when the level varies, deterioration of image quality can be suppressed.

Since YC separation, color demodulation, and synchronization separation are performed using digital signals, deterioration or aging of characteristics caused by crosstalk of signals between adjacent circuits, a change in circuit components due to a change in temperature, variations in individual circuit components, and the like can be prevented.

When the circuit is realized by a single semiconductor integrated circuit, an apparatus having a high integration degree, low cost, and low power consumption can be realized. Only two A/D converters for external inputs are required. Special effects such as enlargement, reduction, and the like can be similarly applied to an externally input signal as in a camera photographing mode.

Figure 12:
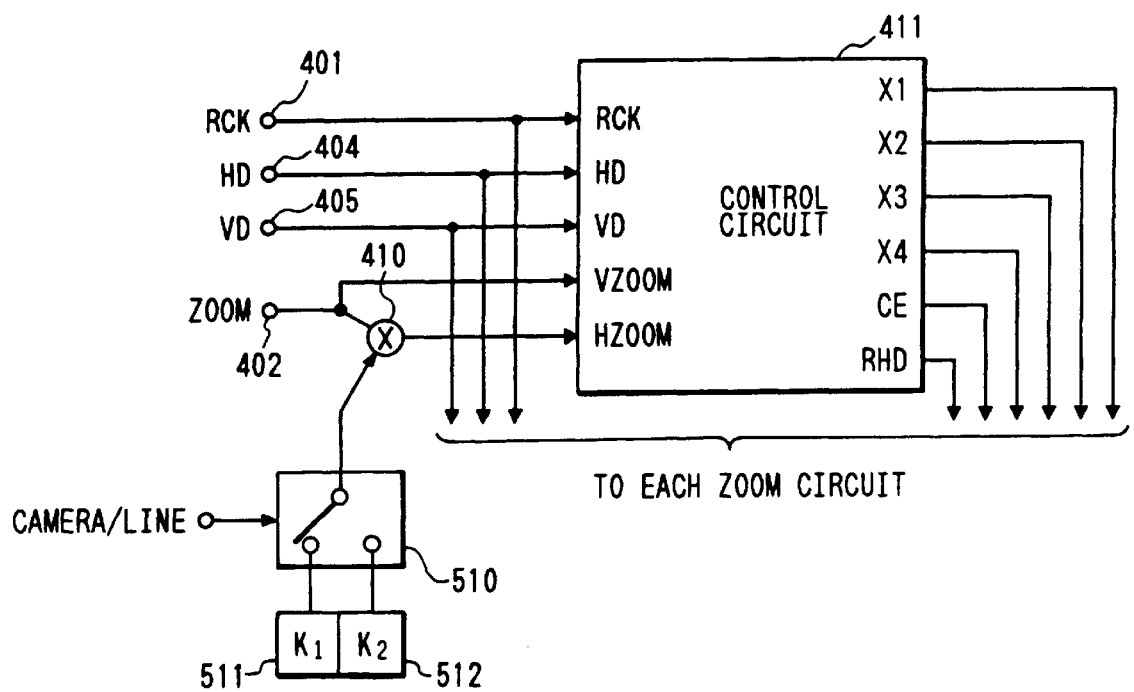
FIG. 12 is a block diagram showing in detail main part of an electronic zoom circuit in FIGS. 11A and 11B.

FIG. 12 shows the detailed arrangement of main part of the electronic zoom circuit 207 in FIGS. 11A and 11B according to the eighth embodiment of the present invention. Circuit portions other than those shown in FIG. 12 are the same as those in FIG. 9 or 10.

Referring to FIG. 12, the circuit 207 includes a switch circuit 510, and coefficient circuits 511 and 512 respectively having coefficients K1 and K2.

A zoom signal ZOOM input from the zoom input terminal 402 is input to the control circuit 411 as a vertical zoom signal VZOOM, and is simultaneously input to the multiplier 410. The output from the multiplier 410 is input to the control circuit 411 as a horizontal zoom signal HZOOM.

One of the coefficients K1 and K2 of the coefficient circuits 511 and 512 is selected by the switch circuit 510 in accordance with a camera/external input switching signal, and the selected coefficient is input to the other input of the above-mentioned multiplier 410.

The control circuit 411 generates interpolation coefficients X1, X2, X3, and X4, and the CE and RHD in accordance with the above-mentioned inputs RCLK, HD, VD, VZOOM, and HZOOM, and performs enlargement, reduction, and clock rate conversion in the same manner as in FIG. 9 or 10. In this case, the clock rate can be converted at an appropriate ratio in correspondence with the camera recording mode or the external input recording mode. In this case, an increase in the number of circuit components can be minimized.

Figure 13:
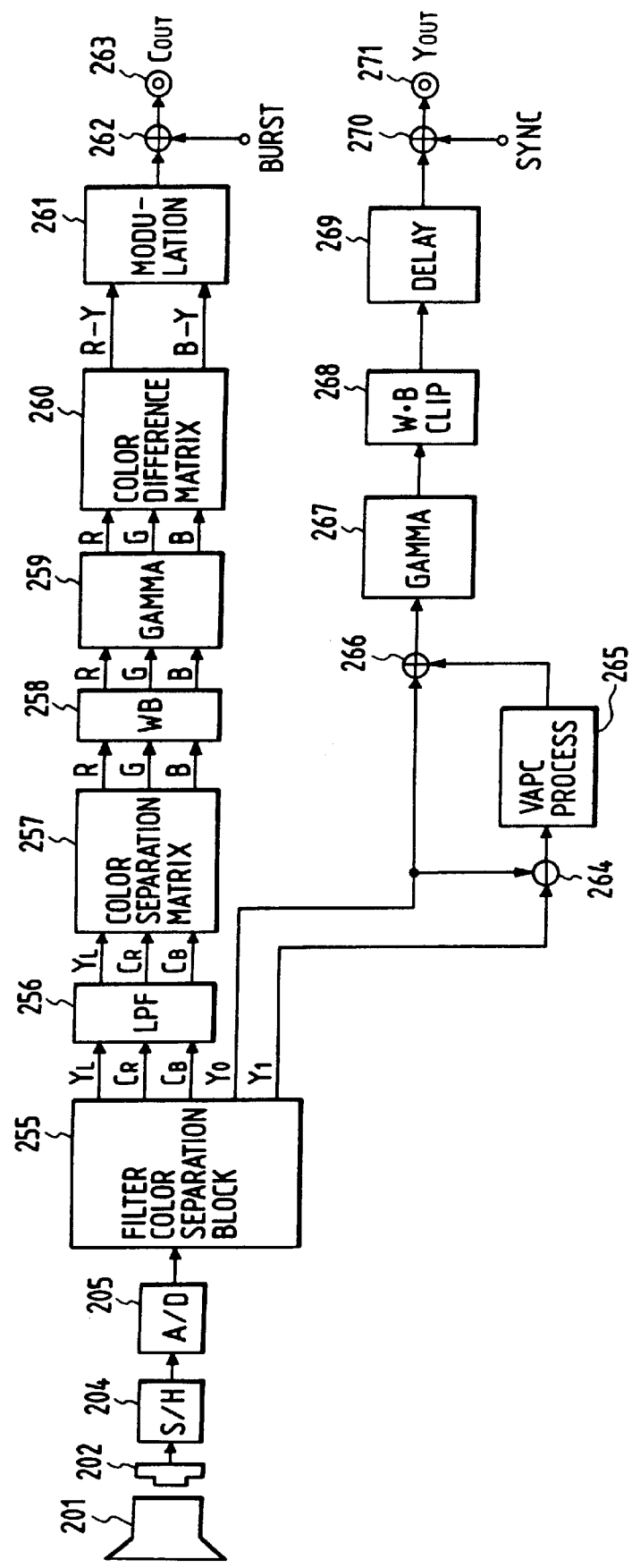
FIG. 13 is a block diagram showing the ninth embodiment of the present invention.

The ninth embodiment of the present invention will be described below with reference to FIG. 13. Referring to FIG. 13, an apparatus includes an image pickup lens 201, a CCD 202 as a color image pickup element, an S/H circuit 204, and an A/D converter 205.

The apparatus also includes a filter color separation block 255 for obtaining a luminance signal $Y_0$, a luminance signal $Y_1$ delayed from $Y_0$ by one horizontal period (to be referred to as 1H hereinafter), and chrominance signals $Y_L$, $C_R$, and $C_B$.

The apparatus further includes a low-pass filter 256 and a color separation matrix circuit 257 for performing a matrix calculation of the input chrominance signals $Y_L$, $C_R$, and $C_B$ to obtain primary color signals R, G, and B.

The apparatus also includes a white balance circuit 258 for multiplying the input signals R, G, and B with coefficients according to the object illumination light color temperature, a gamma circuit 259 for performing gamma correction of the input signals R, G, and B, a color-difference matrix 260 for synthesizing color-difference signals R-Y and B-Y from the input signals R, G, and B, and a modulation circuit 261 for performing quadrature modulation of the input signals R-Y and B-Y with a color subcarrier.

The apparatus also includes a burst adder 262, a chrominance signal output terminal 263, a subtracter 264, a vertical aperture signal processing circuit (VAPC processing) 265 including gain varying processing, base clipping processing, and low-pass filter processing, an adder 266, a gamma circuit 267, a white-black clipping circuit 268, a delay circuit 269, a synchronization adder 270, and a Y output terminal 271.

In this embodiment with the above-mentioned arrangement, an object image (not shown) is formed on the photoelectric conversion surface of the CCD 202 via the image pickup lens 201, and is photoelectrically converted into image pickup signals. The image pickup signals are output to the S/H circuit 204. The image pickup signals are converted into a continuous signal by the S/H circuit 204, and the continuous signal is A/D-converted into a digital image pickup signal by the A/D converter 205. The digital image pickup signal is converted into chrominance signals $Y_L$, $C_R$, and $C_B$, and luminance signals $Y_0$ and $Y_1$ by the filter color separation block 255.

The chrominance signals $Y_L$, $C_R$, and $C_B$ are formed as follows. More specifically, four different types of small color filters $Y_e$, $C_y$, $M_g$, and G are formed on the photoelectric conversion portion of the CCD 202. In a read operation, the CCD 202 adds and reads outputs from these filters as four combinations $Y_e+M_g$, $C_y+G$, $Y_e+G$, and $C_y+M_g$ by an interlace operation. These combinations will be referred to as $W_r$, $G_b$, $G_r$, and $W_b$ for the sake of simplicity.

On the filter color separation block, the following calculations of the outputs are performed:

$Y_L = W_r + G_b$ or $G_r + W_b$ $C_R = W_r - G_b$ $C_B = G_r - W_b$

Primary color components in these signals are:

$Y_L = 2R + 3G + 2B$ $C_R = 2R - G$ $C_B = G - 2B$

The matrix calculation of these signals is performed by the color separation matrix (to be described later) to obtain primary color components R, G, and B.

The obtained signals $Y_L$, $C_R$, and $C_B$ are input to the low-pass filter 256 to extract their low-frequency components. Then, the color separation matrix performs the following matrix calculation of the input signals $Y_L$, $C_R$, and $C_B$ to separate the primary color components R, G, and B:

$$\begin{pmatrix} R \\ G \\ B \end{pmatrix} = \begin{pmatrix} a_{11} & a_{12} & a_{13} \\ a_{21} & a_{22} & a_{23} \\ a_{31} & a_{32} & a_{33} \end{pmatrix} \begin{pmatrix} Y_L \\ C_R \\ C_B \end{pmatrix}$$

The components R, G, and B obtained as described above are adjusted by the white balance circuit 258 by multiplying them with the reciprocal ratio of the color component ratio in object illumination light, so that the components R, G, and B of a white object have a ratio of 1:1:1. Thereafter, the components R, G, and B are subjected to predetermined gamma correction in the gamma circuit 259.

Then, the color-difference matrix 260 performs a predetermined calculation to obtain color-difference signals R-Y and B-Y. The color-difference signals are subjected to quadrature modulation in the modulation circuit 261, and a burst signal is added to the modulated signal by the burst adder 262. The chrominance signal output from the adder 262 is directly output from the C output terminal 263, or is output to an external device such as a television, a VTR, or the like after D/A conversion.

The signals $Y_0$ and $Y_1$ output from the filter color separation block 255 are input to the subtracter 264 to obtain a signal $Y_1-Y_0$. This signal is subjected to gain varying processing, base clipping processing, and low-pass filter processing in the VAPC processing circuit 265 so as to form a vertical aperture signal.

The vertical aperture signal is added to the signal $Y_0$ by the adder 266, and the sum signal is subjected to gamma correction in the gamma circuit 267. Then, the signal output from the circuit 267 is clipped at predetermined white and black levels in the white-black slipping circuit 268, and is then delayed by the delay circuit 269.

Since the total number of delay stages in a signal processing circuit formed by the circuits 256, 257, 258, 259, 260, 261, 262, and 263 is larger than that of a luminance signal processing circuit formed by the circuits 264, 265, 266, 267, 268, 269, 270, and 271, the delay amount of the delay circuit 269 is set to be a delay amount corresponding to the difference between these total numbers. The output from the delay circuit 269 is added to a synchronization signal by the synchronization adder 270, and the sum signal is connected to an external device via the Y output terminal 271 in the same manner as the above-mentioned signal.

Figure 14:
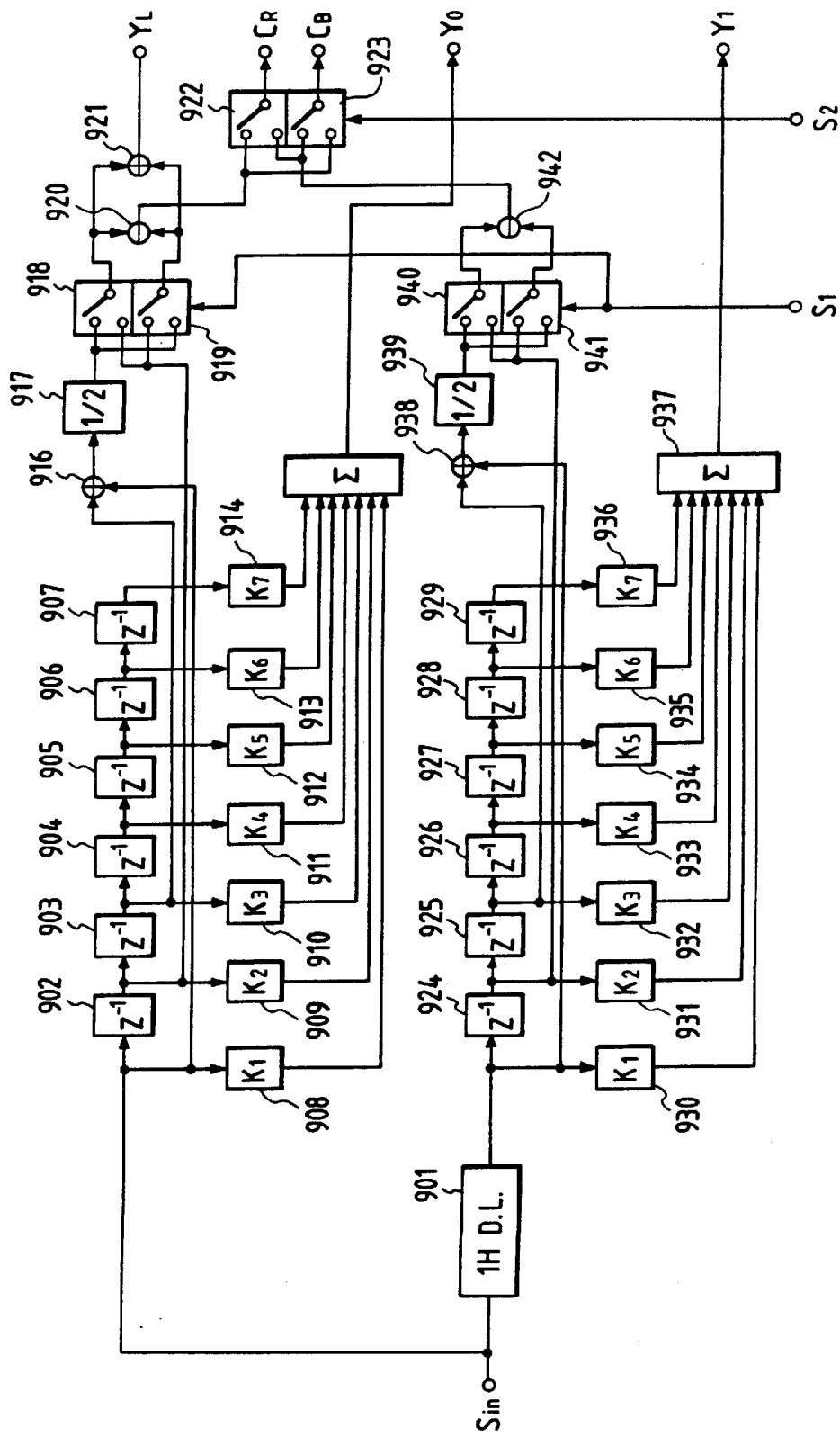
FIG. 14 is a circuit diagram showing in detail the arrangement of a filter color separation block in FIG. 13.

FIG. 14 is a block diagram showing in detail the arrangement of the filter color separation block 255 in FIG. 13. Referring to FIG. 14, the block 255 includes a delay line (1H D.L.) 901 for 1H, and delay elements 902, 903, 904, 905, 906, 907, 924, 925, 926, 927, 928, and 929 such as D-type flip-flops.

The block 255 also includes coefficient multipliers 908, 909, 910, 911, 912, 913, 914, 930, 931, 932, 933, 934, 935, and 936 respectively having predetermined coefficients $K_1$ to $K_7$.

The block 255 further includes adding up circuits 915 and 937 for adding up all input signals, adders 916, 921, and 938, ½ coefficient multipliers 917 and 939, switch circuits 918, 919, 922, 923, 940, and 941, and subtracters 920 and 942.

In the filter color separation block 255 with the above-mentioned arrangement, an input signal $S_{in}$ is delayed by the delay elements 902 to 907, and the signal $S_{in}$ and the outputs from these delay elements are respectively multiplied with the coefficients $K_1$ to $K_7$ by the coefficient multipliers 908 to 914. These product signals are added up by the adding up circuit 915, thus forming and outputting the luminance signal $Y_0$.

The input signal $S_{in}$ and the output from the delay element 903 are added to each other by the adder 916, and the sum signal is multiplied with ½ by the coefficient multiplier 917. Then, the product signal and the output from the delay element 902 are alternately selected by the switch circuits 918 and 919 in accordance with a switching signal $S_1$. This switching signal $S_1$ is used for switching signals in accordance with the arrangement of the color filters on the CCD 202 in synchronism with the horizontal scanning clock.

The outputs from the switch circuits 918 and 919 are added to each other to obtain the signal $Y_L$, and at the same time, a difference between these outputs is calculated by the subtracter 920. The output from the subtracter 920 and the output from the subtracter 942 (to be described later) are alternately switched by the switch circuits 922 and 923 in accordance with a switching signal $S_2$, thus forming and outputting the signals $C_R$ and $C_B$.

On the other hand, the input signal $S_{in}$ is delayed by 1H by the delay line 901, and the luminance signal $Y_1$ delayed from $Y_0$ by 1H is generated and output by the delay elements 924 to 929, the coefficient multipliers 930 to 936, and the adding up circuit 937 in the same manner as described above.

As in the above-mentioned operation, the outputs from the delay line 901 and the delay element 925 are added to each other and multiplied with ½ via the adder 938 and the coefficient multiplier 939, and the output from the coefficient multiplier 939 and the output from the delay element 924 are alternately selected by the switch circuits 940 and 941. The difference between the outputs from the switch circuits 940 and 941 is calculated by the subtracter 942, and as described above, the output from the subtracter 942 and the output from the subtracter 920 are alternately selected to form and output the signals $C_R$ and $C_B$.

In FIG. 14, $Y_0$ is obtained by the following transfer function $H_1(Z)$:

$$H_1(Z) = K_1 + Z^{-1} \cdot K_2 + Z^{-2} \cdot K_3 + Z^{-3} \cdot K_4 + Z^{-4} \cdot K_5 + Z^{-5} \cdot K_6 + Z^{-6} \cdot K_7$$

In a normal video filter, $K_1=K_7$, $K_2=K_6$, and $K_3=K_5$. At this time, the group delay time is $3\tau$ ($\tau$ is the delay time per stage of the delay element). As for $Y_1$, the group delay time in the horizontal direction is assumed to be $3\tau$.

As for $Y_L$, $C_R$, and $C_B$, although nonlinear circuits (switch circuits) are included, the group delay time in only the horizontal direction is assumed to be $1\tau$.

Therefore, the signals $Y_L$, $C_R$, and $C_B$ are output earlier by $2\tau$ than the signals $Y_0$ and $Y_1$, and the number of stages of the above-mentioned delay circuit 269 can be decreased.

Figure 15:
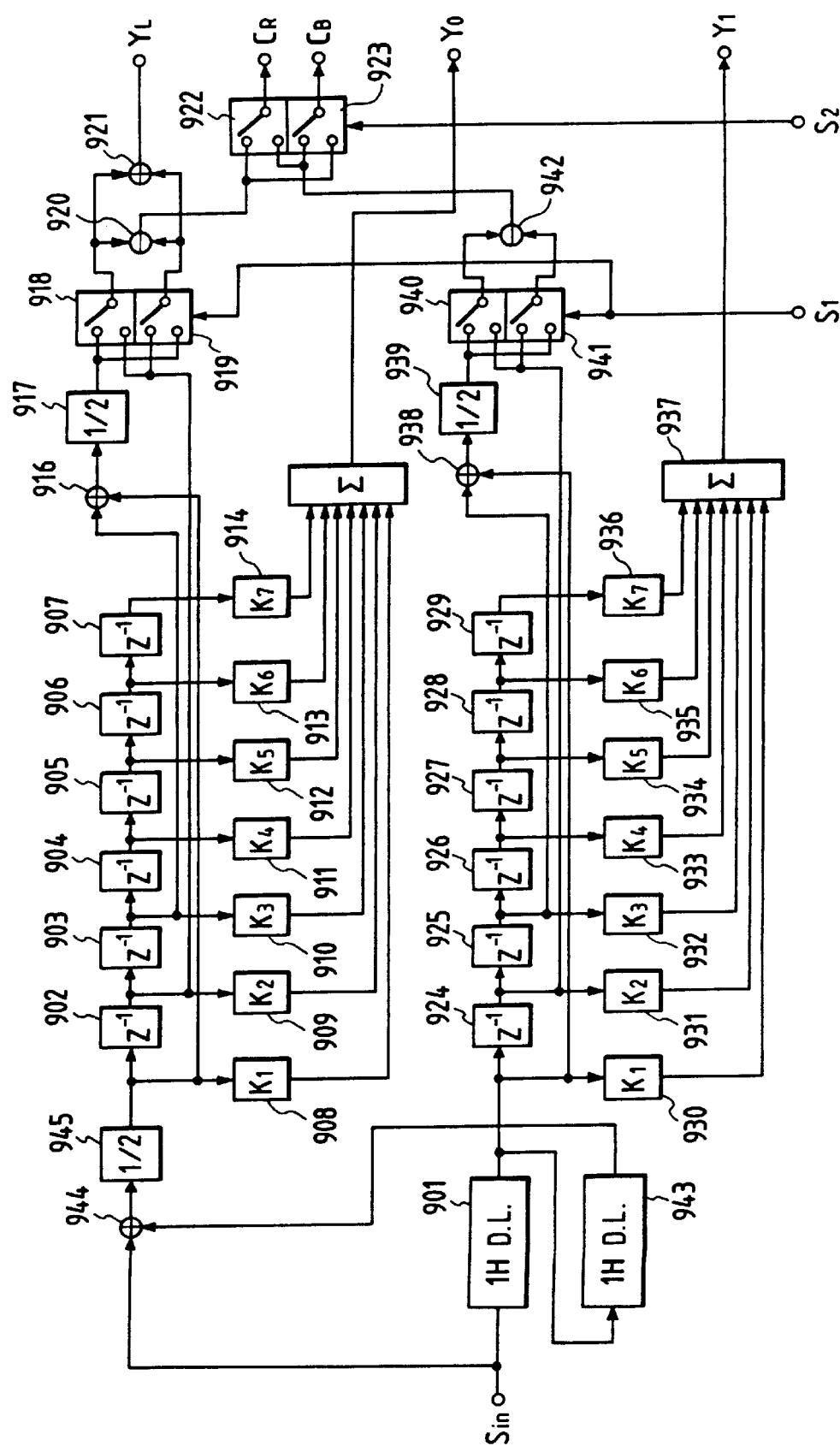
FIG. 15 is a circuit diagram showing in detail another arrangement of the filter color separation block in FIG. 13.

FIG. 15 is a block diagram showing another embodiment of the filter color separation block. The same reference numerals in FIG. 15 denote the same parts as in FIG. 14.

Referring to FIG. 15, the filter color separation block includes a 1H delay line 943, an adder 944, and a coefficient multiplier 945 having a coefficient of ½.

An input signal $S_1$ is added to a 2H-delayed signal (to be described later) by the adder 944, and the sum signal is multiplied with ½ by the coefficient multiplier 945. Thereafter, the product signal is input to the delay element 902, the coefficient multiplier 908, and the adder 916 in the same manner as in FIG. 14. The output from the delay line 901 is input to the delay element 924, the coefficient multiplier 930, and the adder 938 as in FIG. 14, and is simultaneously input to the 1H delay line 943.

The delay line 943 further delays the input signal by 1H, and outputs a signal delayed by a total of 2H. The 2H-delayed signal is added to the signal $S_{in}$ by the adder 944, as described above. The following operation is the same as that in FIG. 14.

With this arrangement, when a signal delayed by 1H from the input signal $S_{in}$ is represented by $S_{1H}$, and a signal delayed by 2H from the signal $S_{in}$ is represented by $S_{2H}$, signals used for generating the chrominance signal are $S_{in}+S_{2H}/2$ and $S_{1H}$, and since the centers of gravity in the vertical direction are equal to each other, color smearing (false color signal) due to an error can be eliminated. Since a vertical edge signal of the luminance signal also has an equal center of gravity, a distortion of an image in the vertical direction can be eliminated.

In each of the embodiments described above, the digital recorder circuit performs recording/reproduction of an image. However, the present invention is not limited to this. The present invention can be applied to recording/reproduction apparatuses which receive digital signals.

As described above, according to the embodiments of the present invention, since image pickup video signal data having the first clock rate for operating an image pickup unit and video signal data having the second clock rate for operating the recording unit are converted in the electronic zoom circuit for electronically enlarging or reducing an image, a video signal formed by the camera can be recorded by the digital recorder without being D/A-converted. Thus, deterioration of image quality can be minimized.

When the circuit is realized by an integrated circuit, since it includes many digital circuit portions, high integration, low power consumption, and high precision can be attained.

Furthermore, since the memory and interpolation circuit in the electronic zoom circuit can be commonly used, recording/reproduction of a camera signal and an external signal can be realized by adding a small number of components to the circuit for realizing an electronic zoom function. Therefore, the power consumption and mounting area can be minimized, and the arrangement of the overall apparatus can be simplified.

Also, a digital image pickup signal processing circuit can be realized without increasing the circuit scale.

What is claimed is:

1. An image pickup recording apparatus, comprising:

an image pickup unit operative by a first clock;

electronic zoom means for electronically controlling information amount of an image signal outputted from said image pickup unit; and a recording unit operative by a second clock having a frequency different from a frequency of said first clock, for recording at least an output of said electronic zoom means, wherein said zoom means converts a clock rate of the image signal from the first clock to the second clock when the information amount of the image signal is controlled.

2. The image pickup recording apparatus of claim 1, further comprising:

a camera signal processing circuit in communication with said electronic zoom means, wherein the camera signal processing circuit separates and forms a luminance signal and a color information signal from a digital signal obtained by A/D-converting the image signal outputted from said image pickup unit.

3. The image pickup recording apparatus of claim 1, wherein said electronic zoom means includes:

a plurality of delay circuits for delaying the image signal to produce delayed signals, a plurality of coefficient multipliers for multiplying the delayed signals with predetermined coefficients, and an adding circuit for adding the outputs from said plurality of coefficient multipliers.

4. The image pickup recording apparatus of claim 1, wherein said electronic zoom means is adapted to obtain an enlarged or reduced image by enlarging or reducing an input signal in the horizontal direction and in the vertical direction, and linearly interpolating the input signal.

5. The image pickup recording apparatus of claim 1, wherein said electronic zoom means comprises:

a plurality of input terminals including a zoom signal input, a multiplier for multiplying the zoom signal input with a predetermined coefficient, a control circuit in communication with both the multiplier and the zoom signal input, a plurality of zoom processing circuits, and a plurality of output terminals in communication with the zoom processing circuits.

6. The image pickup recording apparatus of claim 5, wherein the zoom processing circuits each comprises:

a field memory for memorizing the image signal input for one vertical period, a line memory for memorizing the image signal input for one horizontal period, a plurality of flip-flops for delaying a zoom signal for one pixel, a plurality of multipliers for multiplying outputs from the plurality of flip-flops with the outputs of the control circuit, and a plurality of adders for adding the outputs from the plurality of multipliers.

7. An image pickup recording apparatus comprising:

an electronic zoom circuit for electronically enlarging or reducing a size of an input image signal in both a horizontal direction and a vertical direction;

means for inputting the image signal into said electronic zoom circuit at a first clock rate for synchronizing with an image pickup unit; and means for outputting said image signal from said electronic zoom circuit at a second clock rate for synchronizing with a recording unit.

8. An image pickup apparatus operable with a recording unit comprising:

an electronic zoom circuit for electronically enlarging or reducing a size of an input image signal in both a horizontal direction and a vertical direction;

means for inputting the image signal into said electronic zoom circuit at a first clock rate for synchronizing with an image pickup unit; and means for outputting said image signal from said electronic zoom circuit at a second clock rate for synchronizing with said recording unit.

9. An image signal processing apparatus comprising:

an electronic zoom circuit for electronically enlarging or reducing a size of an input image signal in both a horizontal direction and a vertical direction;

means for inputting the image signal into said electronic zoom circuit at a first clock rate for synchronizing with an image pickup unit; and means for outputting said image signal from said electronic zoom circuit at a second clock rate for synchronizing with a recording unit.

* * * * *

UNITED STATES PATENT AND TRADEMARK OFFICE
CERTIFICATE OF CORRECTION

PATENT NO. : 5,966,171
DATED : October 12, 1999
INVENTOR(S) : Teruo Hieda et al.

It is certified that error appears in the above-identified patent and that said Letters Patent is hereby corrected as shown below:

Title page,
Item [75], Inventors, please insert the following:
-- Osamu Ueda, Kawasaki-shi and Norihiro Kawahara, Tokyo, Japan --.
Item [56], References Cited, FOREIGN PATENT DOCUMENTS, delete "2/1992" after "0463827 A2" and insert therefor -- 1/1992 --.
OTHER PUBLICATIONS, "Japanese Patent Abstract JP2132988," reference, delete "Futugawa" and insert therefor -- Futagawa --

Column 14,
Line 12, delete "oven" and insert therefor -- even --.
Line 16, delete "he" and insert therefor -- the --.

Column 17,
Line 10, delete "E-Y" and insert therefor -- B-Y --.

Signed and Sealed this

Eighth Day of March, 2005

JON W. DUDAS
*Director of the United States Patent and Trademark Office*